(12) United States Patent
McBride et al.

(10) Patent No.: US 11,297,069 B2
(45) Date of Patent: *Apr. 5, 2022

(54) UTILIZING BLOCKCHAINS TO IMPLEMENT NAMED DATA NETWORKING

(71) Applicant: CenturyLink Intellectual Property LLC, Broomfield, CO (US)

(72) Inventors: Kevin M. McBride, Lone Tree, CO (US); Stephen Opferman, Denver, CO (US); Steven M. Casey, Littleton, CO (US); William O'Brien, Jr., Aurora, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 243 days.

This patent is subject to a terminal disclaimer.

(21) Appl. No.: 16/774,962

(22) Filed: Jan. 28, 2020

(65) Prior Publication Data

US 2020/0252220 A1 Aug. 6, 2020

Related U.S. Application Data

(60) Provisional application No. 62/957,065, filed on Jan. 3, 2020, provisional application No. 62/818,539, filed
(Continued)

(51) Int. Cl.
*G06F 15/16* (2006.01)
*H04L 29/06* (2006.01)
(Continued)

(52) U.S. Cl.
CPC .............. *H04L 63/12* (2013.01); *G06F 16/27* (2019.01); *H04L 9/0643* (2013.01);
(Continued)

(58) Field of Classification Search
CPC ... H04L 63/12; H04L 9/3236; H04L 61/1511; H04L 67/2841; H04L 9/0643; H04L 63/1466; G06F 16/27
(Continued)

(56) References Cited

U.S. PATENT DOCUMENTS 10,417,219 B1 * 9/2019 Yang ...................... H04L 9/0643
2018/0219669 A1 * 8/2018 Chen ...................... H04L 9/3236
(Continued)

*Primary Examiner* — Duyen M Doan

(57) ABSTRACT

Novel tools and techniques are provided for utilizing blockchain to implement named data networking. In various embodiments, a computing system might determine whether a cache that is communicatively coupled to the computing system contains data that is responsive to a first request received from a user. If so, the computing system might retrieve and send (to the client device) data that is responsive to the received first request. If not, the computing system might send, to a blockchain system, a second request for identifying a blockchain containing a block containing data responsive to the received first request. In response to identifying such a blockchain, the computing system might receive a copy of the identified blockchain; might abstract, from the identified blockchain, the block containing the data responsive to the received first request; might abstract the data from the identified block; and might send the data to the client device.

20 Claims, 12 Drawing Sheets

Related U.S. Application Data on Mar. 14, 2019, provisional application No. 62/801,235, filed on Feb. 5, 2019.

(51) Int. Cl.
| | |
|---|---|
| *G06F 16/27* | (2019.01) |
| *H04L 9/06* | (2006.01) |
| *H04L 9/32* | (2006.01) |
| *H04L 61/4511* | (2022.01) |
| *H04L 67/568* | (2022.01) |
| *G06F 16/23* | (2019.01) |

(52) U.S. Cl.
CPC ........ *H04L 9/3236* (2013.01); *H04L 61/1511* (2013.01); *H04L 63/126* (2013.01); *H04L 63/1466* (2013.01); *H04L 67/2842* (2013.01); *G06F 16/2379* (2019.01); *H04L 2209/38* (2013.01)

(58) Field of Classification Search
USPC .................................................. 709/203, 217
See application file for complete search history.

(56) References Cited

U.S. PATENT DOCUMENTS

| | | | | |
|---|---|---|---|---|
| 2019/0146946 A1* | 5/2019 | Zhang | ................ | G06F 16/1744 707/667 |
| 2019/0207995 A1* | 7/2019 | Gonzales, Jr. | ........ | H04L 9/3247 |
| 2020/0110824 A1* | 4/2020 | Iwama | ................ | G06F 16/955 |

* cited by examiner

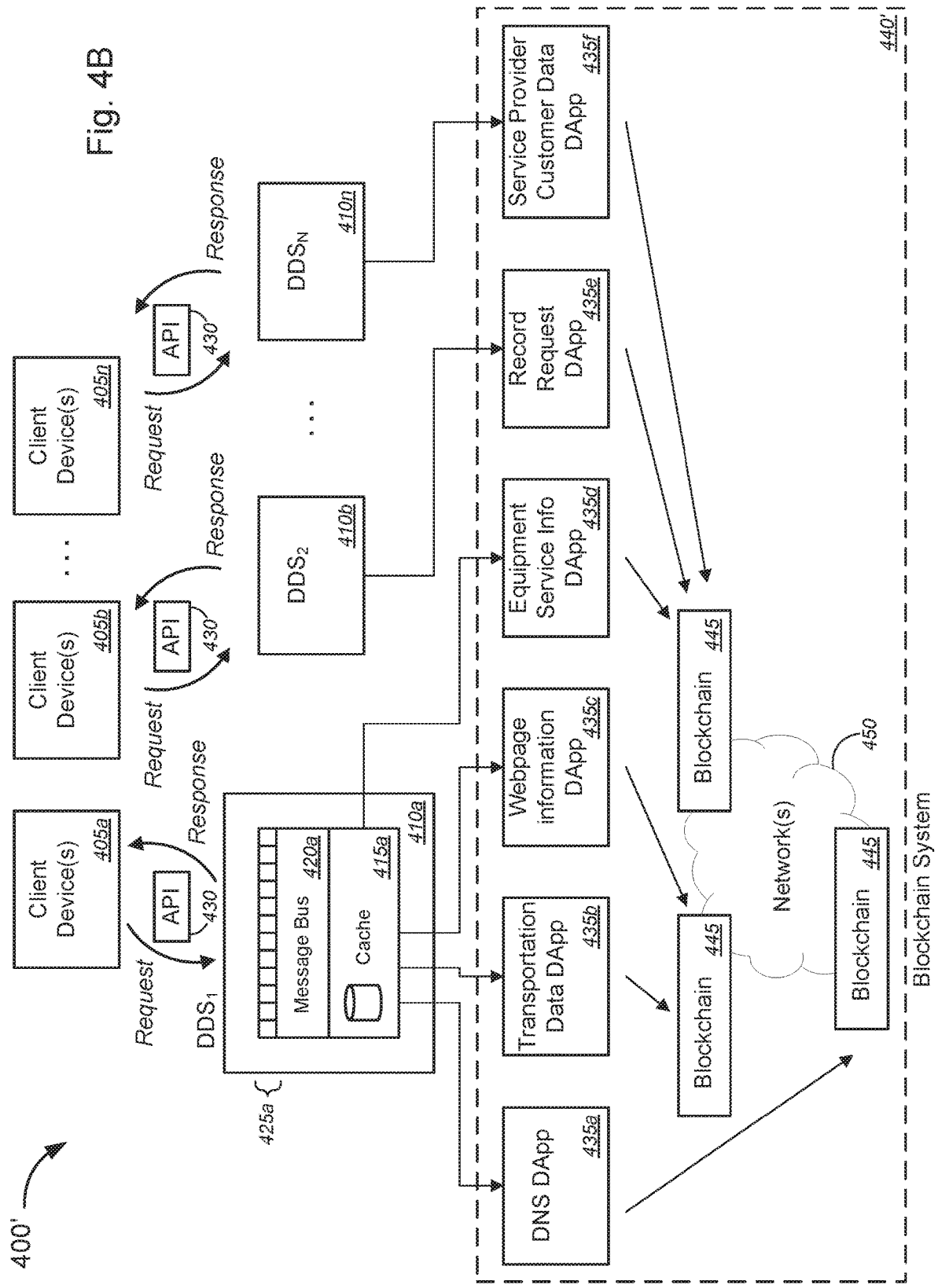

US 11,297,069 B2

UTILIZING BLOCKCHAINS TO IMPLEMENT NAMED DATA NETWORKING

CROSS-REFERENCES TO RELATED APPLICATIONS

This application claims priority to U.S. Patent Application Ser. No. 62/801,235 (the "'235 application"), filed Feb. 5, 2019 by Kevin M. McBride et al., entitled, "Method and System for Utilizing Blockchains to Implement Named Data Networking," U.S. Patent Application Ser. No. 62/818,539 (the "'539 Application"), filed Mar. 14, 2019 by Steven M. Casey et al., entitled, "Method and System for Implementing Data and Source Validation for Equipment Output Data or Equipment Failure Prediction Using Blockchains," and U.S. Patent Application Ser. No. 62/957,065 (the "'065 Application"), filed Jan. 3, 2020 by Kevin M. McBride et al., entitled, "Data and Source Validation for Equipment Output Data or Equipment Failure Prediction Using Blockchains or Tracking or Storing of Equipment Configuration Data Using Immutable Ledger Functionality of Blockchains," the disclosure of each of which is incorporated herein by reference in its entirety for all purposes.

This application may be related to one or more of: U.S. patent application Ser. No. 16/774,974 (The "'974 Application"), filed Jan. 28, 2020 by Steven M. Casey et al., entitled, "Data and Source Validation for Equipment Output Data or Equipment Failure Prediction Using Blockchains"; or U.S. patent application Ser. No. 16/774,989 (the "'989 Application"), filed Jan. 28, 2020 by Kevin M. McBride et al., entitled, "Tracking or Storing of Equipment Configuration Data Using Immutable Ledger Functionality of Blockchains." Each of these applications claims priority to the '235, '539, and '065 Applications.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing named data networking, and, more particularly, to methods, systems, and apparatuses for utilizing blockchains to implement named data networking.

BACKGROUND

In conventional systems, information or data from devices or from logging or record systems might be received by data dissemination systems or data collection systems. Such information or data, however, may be susceptible to interception by nefarious parties and/or spoofing by such parties, thus resulting in information or data that is unreliable or untrustworthy.

Hence, there is a need for more robust and scalable solutions for implementing named data networking, and, more particularly, to methods, systems, and apparatuses for utilizing blockchains to implement named data networking.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A and 4B are schematic diagrams illustrating various embodiments for yet another system for utilizing blockchains to implement named data networking, in accordance with various embodiments.

DETAILED DESCRIPTION OF CERTAIN EMBODIMENTS

Overview

Figure 1:
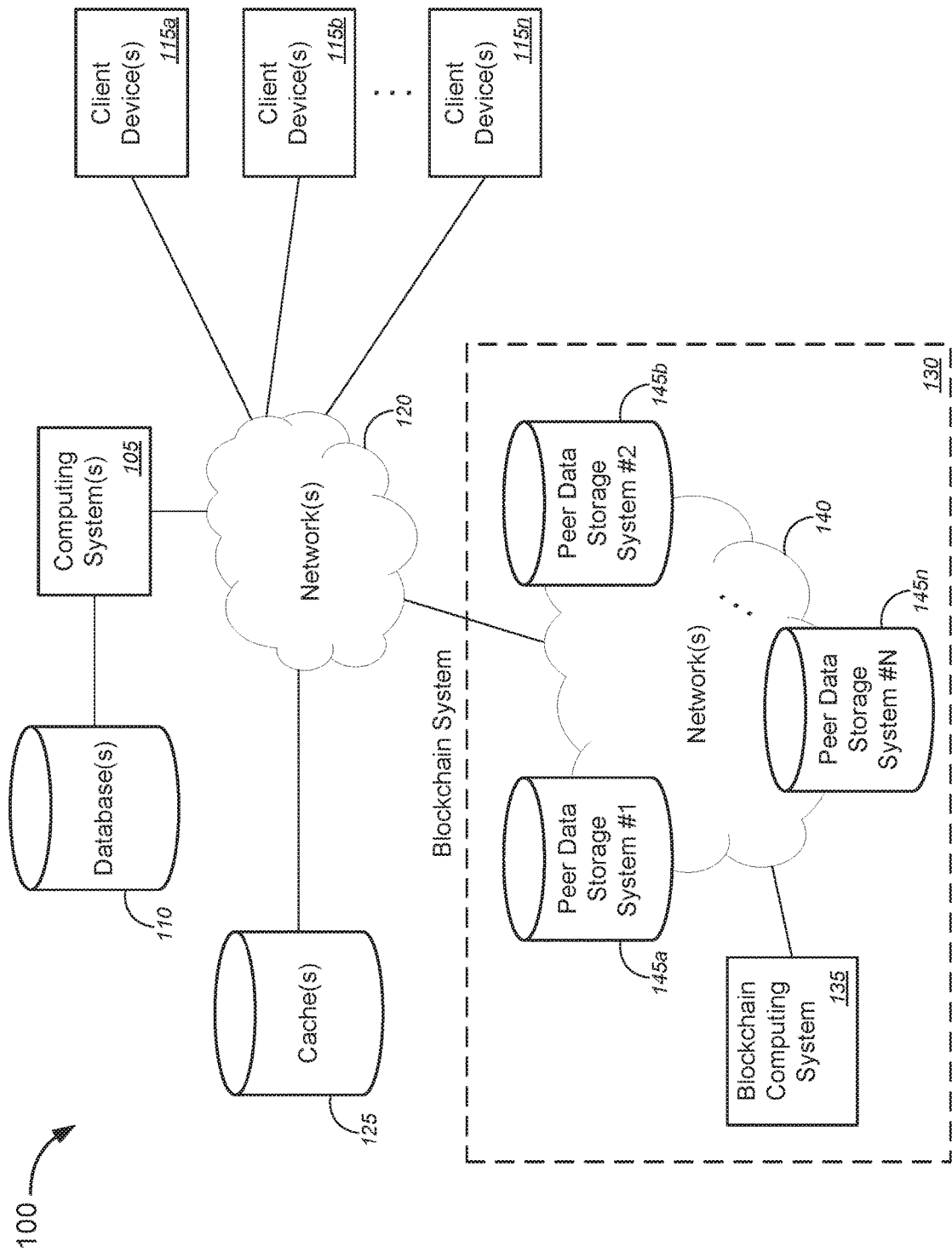
FIG. 1 is a schematic diagram illustrating a system for utilizing blockchains to implement named data networking, in accordance with various embodiments.

Various embodiments provide tools and techniques for implementing named data networking, and, more particularly, to methods, systems, and apparatuses for utilizing blockchains to implement named data networking.

In various embodiments, a computing system might receive a first request from a user via a client device, and might determine whether a cache that is communicatively coupled to the computing system contains data that is responsive to the received first request. Based on a determination that the cache contains data that is responsive to the received first request, the computing system might retrieve the data that is responsive to the received first request, and might send the retrieved data to the client device. On the other hand, based on a determination that the cache does not contain data that is responsive to the received first request, the computing system might send, to a blockchain system, a second request for identifying a blockchain containing a block containing data responsive to the received first request.

In response to the blockchain system identifying a blockchain containing a block containing data responsive to the received first request, the computing system (or a blockchain computing system) might receive a copy of the identified blockchain from the blockchain system; might abstract, from the identified blockchain, the block containing the data responsive to the received first request; might abstract, from the identified block, the data responsive to the received first request; and might send the data to the client device.

According to some embodiments, the first request might comprise a domain name system ("DNS") request, where the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp"). In some embodiments, the first request might comprise a hypertext transfer protocol ("HTTP") record request, where the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might include, but is not limited to, one of service provider customer data, webpage information, or equipment service information, and/or the like. In some cases, sending the second request to the blockchain system might comprise sending, with the computing system and to the blockchain system, the second request via corresponding one of a service provider customer data DApp, a webpage information DApp, or an equipment service information DApp, and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system, in one or more first blocks of a first blockchain. In some instances, the usage data for the network device and the geolocation information for the network device might be abstracted from usage data records and stored, via the blockchain system, in one or more second blocks of a second blockchain. Alternatively, or additionally, the data control information for the network device might be abstracted from application programming interface ("API") calls and stored, via the blockchain system, in one or more third blocks of a third blockchain. Alternatively, or additionally, the information regarding critical events associated with the network device might be abstracted from a simple network management protocol ("SNMP") events system and stored, via the blockchain system, in one or more fourth blocks of a fourth blockchain. Alternatively, or additionally, the information regarding open trouble tickets might be abstracted from a trouble tickets system and stored, via the blockchain system, in one or more fifth blocks of a fifth blockchain. Alternatively, or additionally, the information regarding data monetization for the network device might be abstracted from a network server and stored, via the blockchain system, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

The various embodiments described herein utilize the functionalities, advantages, and features of blockchain systems to make such information or data more secure and more transparently reliable due to the inherent validation capabilities of blockchain ledgers or the like, and the inherent capabilities of blockchain systems to clearly prevent covert replacement or modification of information contained in the blocks of the blockchain.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, named data system technologies, data logging technologies, data request and retrieval technologies, and/or the like. In other aspects, certain embodiments, can improve the functioning of user equipment or systems themselves (e.g., named data systems, data logging systems, data request and retrieval systems, etc.), for example, by receiving, with a computing system, a first request from a user via a client device; determining, with the computing system, whether a cache that is communicatively coupled to the computing system contains data that is responsive to the received first request; based on a determination that the cache contains data that is responsive to the received first request, retrieving, with the computing system, the data that is responsive to the received first request, and sending, with the computing system, the retrieved data to the client device; based on a determination that the cache does not contain data that is responsive to the received first request, sending, with the computing system and to a blockchain system, a second request for identifying a blockchain containing a block containing data responsive to the received first request; and in response to the blockchain system identifying a blockchain containing a block containing data responsive to the received first request, performing the following: receiving, with the computing system, a copy of the identified blockchain from the blockchain system; abstracting, with the computing system and from the identified blockchain, the block containing the data responsive to the received first request; abstracting, with the computing system and from the identified block, the data responsive to the received first request; and sending, with the computing system, the data to the client device; and/or the like.

In particular, to the extent any abstract concepts are present in the various embodiments, those concepts can be implemented as described herein by devices, software, systems, and methods that involve specific novel functionality (e.g., steps or operations), such as, utilizing the functionalities, advantages, and features of blockchain systems to make information or data from data logging by data systems (e.g., user devices, client devices, network devices, event logging systems, service record systems, usage data logging systems, application programming interface ("API") call logging systems, simple network management protocol ("SNMP") events system, and trouble ticket logging systems, etc.) more secure and more transparently reliable due to the inherent validation capabilities of blockchain ledgers or the like, and the inherent capabilities of blockchain systems to clearly prevent covert replacement or modification of information contained in the blocks of the blockchain; and/or the like, to name a few examples, that extend beyond mere conventional computer processing operations. These functionalities can produce tangible results outside of the implementing computer system, including, merely by way of example, providing a more secure system for collection, logging, and transfer of data from data systems and resulting in information or data that is more reliable and more trustworthy, and/or the like, at least some results of which may be observed or measured by customers and/or service providers.

In an aspect, a method might comprise receiving, with a computing system, a first request from a user via a client device; determining, with the computing system, whether a cache that is communicatively coupled to the computing system contains data that is responsive to the received first request; based on a determination that the cache contains data that is responsive to the received first request, retrieving, with the computing system, the data that is responsive to the received first request, and sending, with the computing system, the retrieved data to the client device; and based on a determination that the cache does not contain data that is responsive to the received first request, sending, with the computing system and to a blockchain system, a second request for identifying a blockchain containing a block containing data responsive to the received first request. The method might further comprise, in response to the blockchain system identifying a blockchain containing a block containing data responsive to the received first request, performing the following: receiving, with the computing system, a copy of the identified blockchain from the blockchain system; abstracting, with the computing system and from the identified blockchain, the block containing the data responsive to the received first request; abstracting, with the computing system and from the identified block, the data responsive to the received first request; and sending, with the computing system, the data to the client device.

In some embodiments, the computing system might comprise one of a data dissemination system, a named data system, a server computer, a cloud-based computing system over a network, or a distributed computing system, and/or the like. In some cases, the client device might comprise one of a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like.

Merely by way of example, in some instances, the first request might comprise a domain name system ("DNS") request, wherein the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp").

According to some embodiments, the first request might comprise a hypertext transfer protocol ("HTTP") record request, wherein the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might comprise one of service provider customer data, webpage information, or equipment service information, and/or the like. In some cases, sending the second request to the blockchain system might comprise sending, with the computing system and to the blockchain system, the second request via corresponding one of a service provider customer data DApp, a webpage information DApp, or an equipment service information DApp, or the like. In some instances, the service provider customer data might comprise one of customer data associated with Internet service, customer data associated with transportation service, customer data associated with cellular communications service, customer data associated with data services, or customer data associated with media content services, and/or the like.

Alternatively, or additionally, the first request might comprise a request for information regarding a network device. In some instances, metadata regarding the network device might be contained in the block of the identified blockchain, where the metadata might comprise at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system, in one or more first blocks of a first blockchain. In some instances, the usage data for the network device and the geolocation information for the network device might be abstracted from usage data records and stored, via the blockchain system, in one or more second blocks of a second blockchain. Alternatively, or additionally, the data control information for the network device might be abstracted from application programming interface ("API") calls and stored, via the blockchain system, in one or more third blocks of a third blockchain. Alternatively, or additionally, the information regarding critical events associated with the network device might be abstracted from a simple network management protocol ("SNMP") events system and stored, via the blockchain system, in one or more fourth blocks of a fourth blockchain. Alternatively, or additionally, the information regarding open trouble tickets might be abstracted from a trouble tickets system and stored, via the blockchain system, in one or more fifth blocks of a fifth blockchain. Alternatively, or additionally, the information regarding data monetization for the network device might be abstracted from a network server and stored, via the blockchain system, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

According to some embodiments, the method might further comprise generating a reputation score of a network device based on metadata regarding the network device that is stored in a block of the blockchain that is generated by the blockchain system, wherein the first request might comprise a request for the reputation score of the network device.

In some embodiments, determining, with the computing system, whether the cache that is communicatively coupled to the computing system contains data that is responsive to the received first request might comprise accessing, with the computing system, the cache via a listening port and one or more application programming interfaces ("APIs"). Alternatively, or additionally, determining whether the cache that is communicatively coupled to the computing system contains data that is responsive to the received first request might comprise: querying, with the computing system, a record of blockchain information to determine whether a flag associated with the data that is responsive to the received first request indicates that the data is cachable and is stored in the cache. In some cases, the determination that the cache contains data that is responsive to the received first request might be based on a determination that the flag associated with the data that is responsive to the received first request indicates that the data is cachable and is stored in the cache. On the other hand, the determination that the cache does not contain data that is responsive to the received first request might be based on a determination that the flag associated with the data that is responsive to the received first request indicates either that the data is non-cachable or that the data is not stored in the cache.

According to some embodiments, the method might further comprise receiving, with the computing system, second data from a second block of a second blockchain; determining, with the computing system, whether the second data is or is not suitable for caching in the cache; based on a determination that the second data is suitable for caching in the cache, storing, with the computing system, the second data in the cache, and updating, with the computing system, the second block of the second blockchain by recording a first flag indicating that the second data is cachable and has been stored in the cache; and based on a determination that the second data is not suitable for caching in the cache, updating, with the computing system, the second block of the second blockchain by recording a second flag indicating that the second data is not suitable for storing in the cache.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive a first request from a user via a client device; determine whether a cache that is communicatively coupled to the computing system contains data that is responsive to the received first request; based on a determination that the cache contains data that is responsive to the received first request, retrieve the data that is responsive to the received first request, and send the retrieved data to the client device; based on a determination that the cache does not contain data that is responsive to the received first request, send, to a blockchain system, a second request for identifying a blockchain containing a block containing data responsive to the received first request; and in response to the blockchain system identifying a blockchain containing a block containing data responsive to the received first request, performing the following: receiving a copy of the identified blockchain from the blockchain system; abstracting, from the identified blockchain, the block containing the data responsive to the received first request; abstracting, from the identified block, the data responsive to the received first request; and sending the data to the client device.

In some embodiments, the apparatus might comprise one of a data dissemination system, a named data system, a server computer, a cloud-based computing system over a network, or a distributed computing system, and/or the like. In some cases, the client device might comprise one of a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like.

According to some embodiments, the first request might comprise a domain name system ("DNS") request, wherein the data that is responsive to the received first request might comprise a DNS response comprising an Internet protocol ("IP") address associated with a website. Alternatively, or additionally, the first request might comprise a hypertext transfer protocol ("HTTP") record request, wherein the data that is responsive to the received first request might comprise a JavaScript object notation ("JSON") record response. Alternatively, or additionally, the first request might comprise one of service provider customer data, webpage information, or equipment service information, and/or the like. In some instances, sending the second request to the blockchain system might comprise sending, with the computing system and to the blockchain system, the second request via corresponding one of a service provider customer data DApp, a webpage information DApp, or an equipment service information DApp. In some cases, the service provider customer data might comprise one of customer data associated with Internet service, customer data associated with transportation service, customer data associated with cellular communications service, customer data associated with data services, or customer data associated with media content services, and/or the like.

In some embodiments, determining, with the computing system, whether a cache that is communicatively coupled to the computing system contains data that is responsive to the received first request might comprise accessing, with the computing system, the cache via a listening port and one or more application programming interfaces ("APIs").

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive a first request from a user via a client device; determine whether a cache that is communicatively coupled to the computing system contains data that is responsive to the received first request; based on a determination that the cache contains data that is responsive to the received first request, retrieve the data that is responsive to the received first request, and send the retrieved data to the client device; based on a determination that the cache does not contain data that is responsive to the received first request, send, to a blockchain system, a second request for identifying a blockchain containing a block containing data responsive to the received first request; and in response to the blockchain system identifying a blockchain containing a block containing data responsive to the received first request, performing the following: receiving a copy of the identified blockchain from the blockchain system; abstracting, from the identified blockchain, the block containing the data responsive to the received first request; abstracting, from the block, the data responsive to the received first request; and sending the data to the client device.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing named data networking, and, more particularly, to methods, systems, and apparatuses for utilizing blockchains to implement named data networking, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for utilizing blockchains to implement named data networking, in accordance with various embodiments.

In the non-limiting embodiment of FIG. 1, system 100 might comprise computing system(s) 105 and corresponding database(s) 110. In some embodiments, the computing system(s) 105 might include, without limitation, one of a data dissemination system, a named data system, a server computer, a cloud-based computing system over a network, or a distributed computing system, and/or the like. System 100 might further comprise one or more client devices 115a-115n (collectively, "client devices 115" or the like), one or more networks 120, one or more caches 125, and a blockchain system 130. In some cases, the one or more client devices 115 might each include, but is not limited to, one of a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. The network(s) 120 might communicatively couple together the computing system(s) 105, the client device(s) 115, the cache(s) 125, and the blockchain system 130.

In some embodiments, the blockchain system 130 might comprise a blockchain computing system 135, one or more networks 140, and peer data storage systems #1 through #N 145a-145n (collectively, "peer data storage systems 145," "distributed peer data storage systems 145," or the like), the blockchain computing system 135 and the peer data storage systems 145 being communicatively coupled to each other via network(s) 140. Each instance of a blockchain containing a plurality of blocks might be stored in two or more of the plurality of peer data storage systems 145a-145n. A non-limiting example of a blockchain (which might include hash values and such, not shown) can be seen in the embodiment of FIG. 2, which are described below. According to some embodiments, data of a block and hash value of a previous block in the blockchain might be encrypted to produce a hash value, using a cryptographic hash function including, without limitation, one of secure hash algorithm-1 ("SHA-1") standard (e.g., a 160-bit hash function, or the like), SHA-2 standard (e.g., SHA-256, SHA-512, SHA-224, SHA-384, SHA-512/224, SHA 512/256, and/or the like), or SHA-3 standard (having same hash lengths as SHA-2 but differing in internal structure compared with the rest of the SHA family of standards), and/or the like.

According to some embodiments, the network(s) 120 and/or 140 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 120 and/or 140 might include an access network of the service provider (e.g., an Internet service provider ("ISP")). In another embodiment, the network(s) 120 and/or 140 might include a core network of the service provider, and/or the Internet.

In operation, computing system(s) 105 might receive a first request from a user via a client device (i.e., one of the client devices 115, or the like), and might determine whether a cache (e.g., cache(s) 125, or the like) that is communicatively coupled to the computing system(s) 105 contains data that is responsive to the received first request. Based on a determination that the cache contains data that is responsive to the received first request, computing system(s) 105 might retrieve the data that is responsive to the received first request, and might send the retrieved data to the client device. On the other hand, based on a determination that the cache does not contain data that is responsive to the received first request, computing system(s) 105 might send, to a blockchain system (e.g., blockchain system 130 or blockchain computing system 135 of blockchain system 130, or the like), a second request for identifying a blockchain containing a block containing data responsive to the received first request.

In response to the blockchain system (e.g., blockchain system 130 or blockchain computing system 135 of blockchain system 130, or the like) identifying a blockchain (such as blockchain 205 of FIG. 2, or the like) containing a block containing data responsive to the received first request, computing system(s) 105 (or blockchain computing system 135) might receive a copy of the identified blockchain from the blockchain system; might abstract, from the identified blockchain, the block containing the data responsive to the received first request; might abstract, from the identified block, the data responsive to the received first request; and might send the data to the client device.

According to some embodiments, the first request might comprise a domain name system ("DNS") request, where the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp"). In some embodiments, the first request might comprise a hypertext transfer protocol ("HTTP") record request, where the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might include, but is not limited to, one of service provider customer data, webpage information, or equipment service information, and/or the like. In some cases, sending the second request to the blockchain system might comprise sending, with the computing system(s) 105 and to the blockchain system 130, the second request via corresponding one of a service provider customer data DApp, a webpage information DApp, or an equipment service information DApp, and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system, in one or more first blocks of a first blockchain. In some instances, the usage data for the network device and the geolocation information for the network device might be abstracted from usage data records and stored, via the blockchain system, in one or more second blocks of a second blockchain. Alternatively, or additionally, the data control information for the network device might be abstracted from application programming interface ("API") calls and stored, via the blockchain system, in one or more third blocks of a third blockchain. Alternatively, or additionally, the information regarding critical events associated with the network device might be abstracted from a simple network management protocol ("SNMP") events system and stored, via the blockchain system, in one or more fourth blocks of a fourth blockchain. Alternatively, or additionally, the information regarding open trouble tickets might be abstracted from a trouble tickets system and stored, via the blockchain system, in one or more fifth blocks of a fifth blockchain. Alternatively, or additionally, the information regarding data monetization for the network device might be abstracted from a network server and stored, via the blockchain system, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

Merely by way of example, in some cases, computing system(s) 105 might generate a reputation score of a network device based on metadata regarding the network device that is stored in a block of the blockchain that is generated by the blockchain system, wherein the first request comprises a request for the reputation score of the network device. Alternatively, or additionally, computing system(s) 105 might receive second data from a second block of a second blockchain; and might determine whether the second data is (or is not) suitable for caching in the cache. Based on a determination that the second data is suitable for caching in the cache, computing system(s) 105 might store the second data in the cache; and might update the second block of the second blockchain by recording a first flag indicating that the second data is cachable and has been stored in the cache. On the other hand, based on a determination that the second data is not suitable for caching in the cache, computing system(s) 105 might update the second block of the second blockchain by recording a second flag indicating that the second data is not suitable for storing in the cache. In this manner, by checking the flag (whether it is a first flag or a second flag, or the like), the computing system(s) 105 might more easily determine whether or not data is suitable for storing in the cache (i.e., whether such data are cachable or non-cachable, or the like).

In some embodiments, determining whether the cache that is communicatively coupled to the computing system(s) 105 contains data that is responsive to the received first request might comprise accessing, with the computing system(s) 105, the cache via a listening port and one or more application programming interfaces ("APIs"). Alternatively, or additionally, determining whether the cache that is communicatively coupled to the computing system(s) 105 contains data that is responsive to the received first request might comprise querying, with the computing system(s) 105, a record of blockchain information to determine whether a flag associated with the data that is responsive to the received first request indicates that the data is cachable and is stored in the cache. In some cases, the determination that the cache contains data that is responsive to the received first request might be based on a determination that the flag associated with the data that is responsive to the received first request indicates that the data is cachable and is stored in the cache, while the determination that the cache does not contain data that is responsive to the received first request might be based on a determination that the flag associated with the data that is responsive to the received first request indicates either that the data is non-cachable or that the data is not stored in the cache.

According to some embodiments, rather than retrieving the data that is responsive to the received first request based on a determination that the cache contains data that is responsive to the received first request, the computing system(s) 105 might first perform verification or authentication tests, including, but not limited to, tests based on time to live ("TTL") analysis to determine timestamps indicating when such data was stored in the cache and to determine what such data's TTL might be (e.g., 1 hour, 1 day, 1 week, 1 month, etc.). Based on a determination that such data was stored for a period exceeding its TTL, then such data may be considered to be untrustworthy, and the computing system(s) 105 might determine that the cache does not contain data that is responsive to the received first request (and thus might send the second request to the blockchain system, as described in detail above). On the other hand, based on a determination that such data was stored for a period within its TTL, then the computing system(s) 105 might consider such data to be trustworthy, and might proceed to retrieve the data from the cache and might send the retrieved data to the client device.

These and other functionalities of the various embodiments are described in detail below with respect to FIGS. 2-6.

Figure 2:
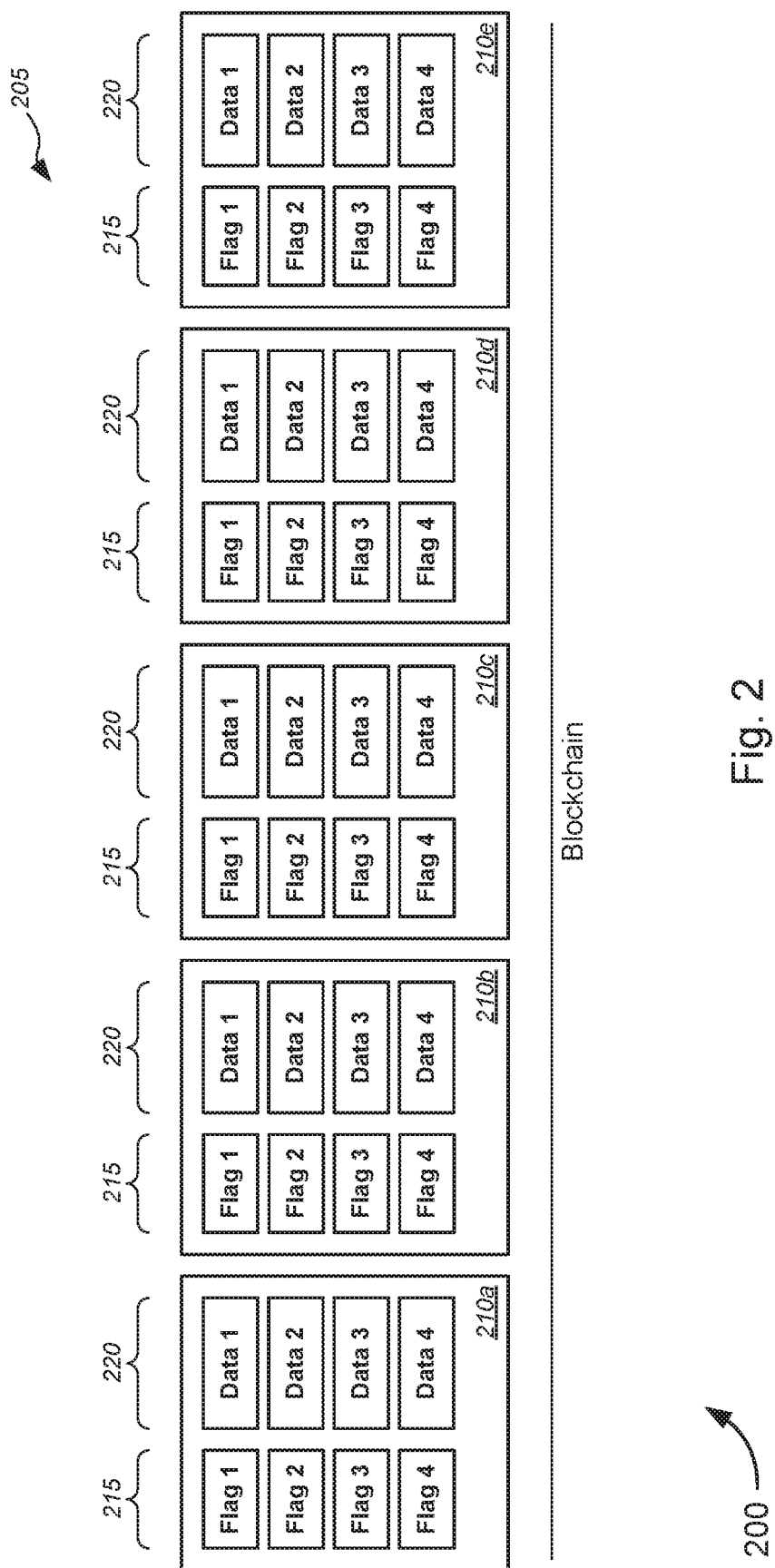
FIG. 2 is a schematic diagram illustrating an example of a blockchain that may be used by a system that utilizes blockchains to implement named data networking, in accordance with various embodiments.

FIG. 2 is a schematic diagram illustrating an example 200 of a blockchain that may be used by a system that utilizes blockchains to implement named data networking, in accordance with various embodiments.

With reference to FIG. 2, an example 200 of a blockchain 205 is depicted. Blockchain 205 might comprise a plurality of blocks 210a-210e (collectively, "blocks 210" or the like), each block 210 containing one or more flags or flag fields #1-#4 215 and/or one or more data fields #1-#4 220. For purposes of simplicity of illustration, only five blocks 210 are shown in the blockchain 205 in FIG. 2, although blockchain 205 might comprise any suitable number of blocks 210. Although only four flags or flag fields 215 are shown in each block 210, the various embodiments are not so limited, and blockchains 205 might contain any suitable number of flags or flag fields 215. Similarly, although only four data fields 220 are shown in each block 210, the various embodiments are not so limited, and blockchains 205 might contain any suitable number of data fields 220. Although not shown, each block 210 might also contain other data or fields, including, but not limited to, block number fields, nonce field, data and/or time stamp fields, previous hash field, hash field, and/or the like.

Figure 3:
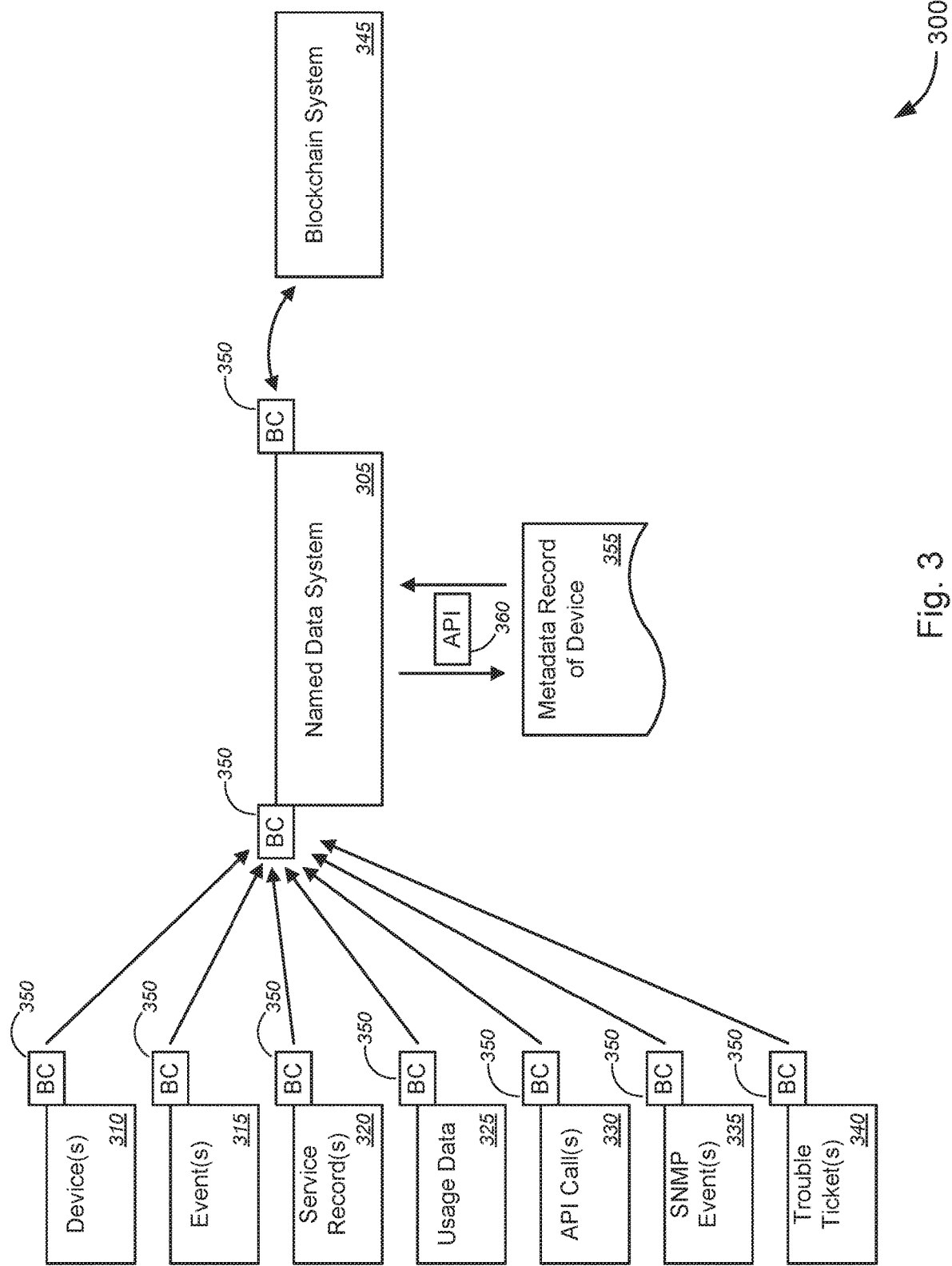
FIG. 3 is a schematic diagram illustrating another system for utilizing blockchains to implement named data networking, in accordance with various embodiments.

FIG. 3 is a schematic diagram illustrating another system 300 for utilizing blockchains to implement named data networking, in accordance with various embodiments.

In the non-limiting embodiment of FIG. 3, system 300 might comprise a named data system ("NDS") 305 (also referred to herein as, "a data dissemination system ("DDS")" or a named data network ("NDN"), or the like), one or more devices 310 (including, but not limited to, user devices, client devices, network devices, and/or the like), event logging systems 315, service record systems 320, usage data logging systems 325, application programming interface ("API") call logging systems 330, simple network management protocol ("SNMP") events system 335, and trouble ticket logging systems 340. System 300 might further comprise a blockchain system 345, a plurality of blockchain interfaces 350, metadata records 355, and an API 360 between the named data system 305 and the metadata records 355.

In conventional systems, information or data from devices or from logging or record systems might be received by data dissemination systems or data collection systems. Such information or data, however, may be susceptible to interception by nefarious parties and/or spoofing by such parties, thus resulting in information or data that is unreliable or untrustworthy. The various embodiments described herein (such as system 300 of FIG. 3, or the like) utilize the functionalities, advantages, and features of blockchain systems to make such information or data more secure and more transparently reliable due to the inherent validation capabilities of blockchain ledgers or the like, and the inherent capabilities of blockchain systems to clearly prevent covert replacement or modification of information contained in the blocks of the blockchain.

In particular, with reference to the non-limiting embodiment of FIG. 3, the blockchain system 345 or the blockchain interfaces 350 might encode or store, in one or more blocks of blockchains, data that is collected or stored by each of the one or more devices 310, the event logging systems 315, the service record systems 320, the usage data logging systems 325, the API call logging systems 330, the SNMP events system 335, and the trouble ticket logging systems 340 (collectively, "data systems" or the like). The blockchain interfaces 350 or each individual data system among the data systems might send the blockchains containing blocks that encode the data from the data systems to the named data system 305, which might store the blockchains or the data encoded in the blocks of the blockchains in the metadata records 355 via API 360.

Figure 4A:
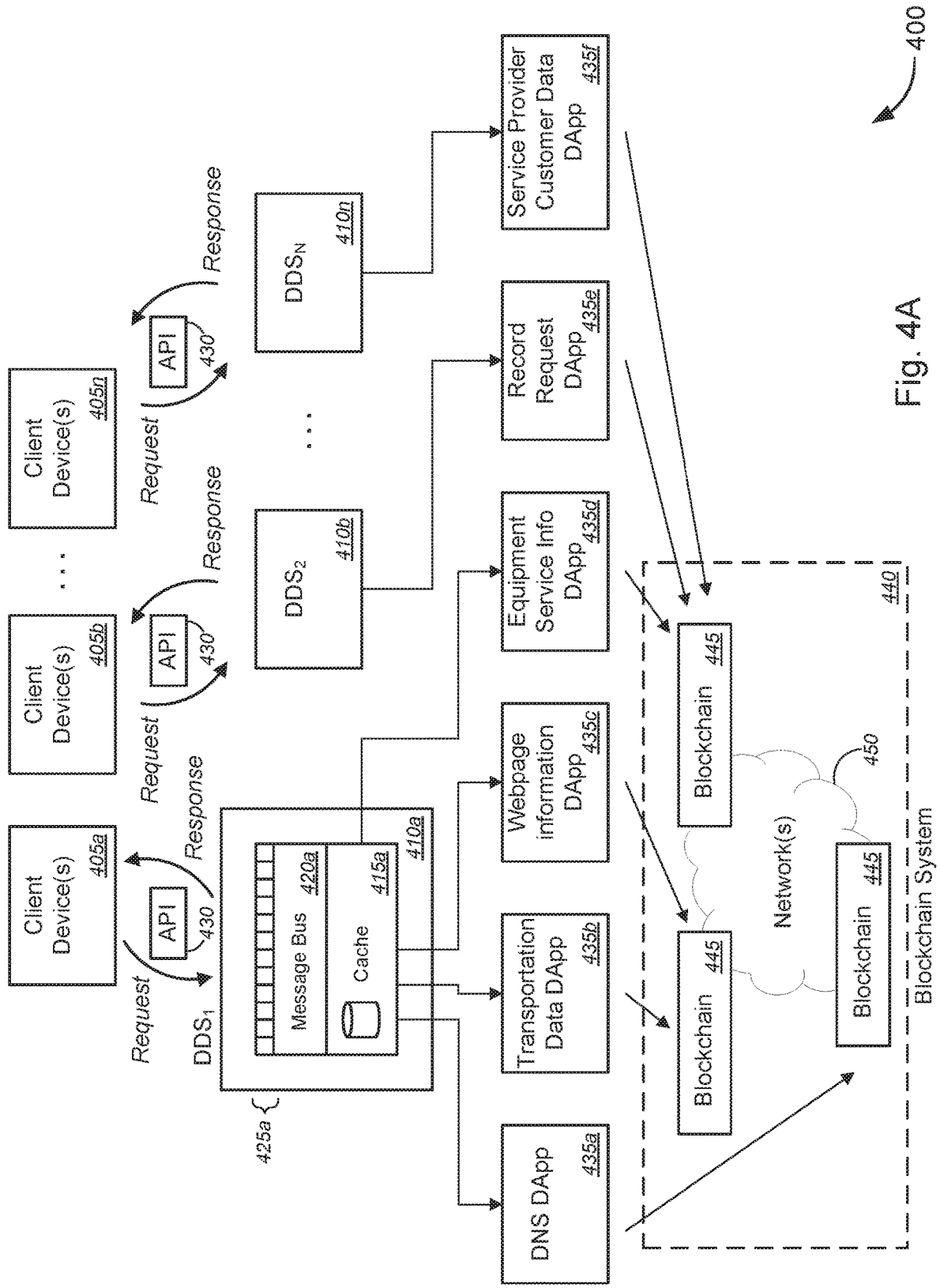

In operation, the named data system 305 might receive a first request from a user via a client device associated with the user, in some cases, via an API (such as API 430 of FIG. 4A or 4B, or the like). The named data system 305 might determine whether the metadata records 355 might contain data that is responsive to the received first request. Based on a determination that the metadata records 355 contains data that is responsive to the received first request, the named data system 305 might retrieve, from the metadata records 355, the data that is responsive to the received first request, and might send the retrieved data to the client device associated with the user. On the other hand, based on a determination that the metadata records 355 do not contain data that is responsive to the received first request, the named data system 305 might send, to the blockchain system 345 (in some cases, via one or more decentralized applications ("DApps"), or the like), a second request for identifying a blockchain containing a block containing data responsive to the received first request. In response to the blockchain system 345 identifying a blockchain containing a block containing data responsive to the received first request, the named data system 305 or the blockchain system 345 might receive a copy of the identified blockchain from the blockchain system 345. The named data system 305 or the blockchain system 345 might abstract, from the identified blockchain, the block containing the data responsive to the received first request; might abstract, from the identified block, the data responsive to the received first request; and might send the data to the client device.

According to some embodiments, the first request might comprise a DNS request, where the data that is responsive to the received first request might comprise a DNS response comprising an Internet protocol ("IP") address associated with a website. In such cases, sending the second request to the blockchain system 345 might comprise sending, with the named data system 305 and to the blockchain system 345, the second request via a DNS DApp (e.g., DNS DApp 435a of FIG. 4A or 4B, or the like). In some embodiments, the first request might comprise a hypertext transfer protocol ("HTTP") record request, where the data that is responsive to the received first request might comprise a JavaScript object notation ("JSON") record response. In such cases, sending the second request to the blockchain system 345 might comprise sending, with the named data system 305 and to the blockchain system 345, the second request via a record request DApp (e.g., record request DApp 435e of FIG. 4A or 4B, or the like).

In some embodiments, the first request might include, but is not limited to, one of service provider customer data, webpage information, or equipment service information, and/or the like. In some cases, sending the second request to the blockchain system 345 might comprise sending, with the named data system 305 and to the blockchain system 345, the second request via corresponding one of a service provider customer data DApp (e.g., service provider customer data DApp 435f of FIG. 4A or 4B, or the like), a webpage information DApp (e.g., webpage information DApp 435c of FIG. 4A or 4B, or the like), or an equipment service information DApp (e.g., equipment service information DApp 435d of FIG. 4A or 4B, or the like), and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system 345, in one or more first blocks of a first blockchain. In some instances, the usage data for the network device and the geolocation information for the network device might be abstracted from usage data records and stored, via the blockchain system 345, in one or more second blocks of a second blockchain. Alternatively, or additionally, the data control information for the network device might be abstracted from application programming interface ("API") calls and stored, via the blockchain system 345, in one or more third blocks of a third blockchain. Alternatively, or additionally, the information regarding critical events associated with the network device might be abstracted from a simple network management protocol ("SNMP") events system and stored, via the blockchain system 345, in one or more fourth blocks of a fourth blockchain. Alternatively, or additionally, the information regarding open trouble tickets might be abstracted from a trouble tickets system and stored, via the blockchain system 345, in one or more fifth blocks of a fifth blockchain. Alternatively, or additionally, the information regarding data monetization for the network device might be abstracted from a network server and stored, via the blockchain system 345, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

FIGS. 4A and 4B (collectively, "FIG. 4") are schematic diagrams illustrating various embodiments 400 and 400' for yet another system for utilizing blockchains to implement named data networking, in accordance with various embodiments.

In the non-limiting embodiment of FIG. 4, system 400 or 400' might comprise one or more client devices 405a-405n (collectively, "client devices 405" or the like) and one or more data dissemination systems ("DDSs") #1-#N 410a-410n (collectively, "DDSs 410" or the like). According to some embodiments, each DDS 410 might comprise a cache 415, a message bus 420, and a plurality of listening ports 425 (e.g., listening ports 80/443, listening ports 53, or the like). For example, the first DDS (e.g., DDS #1) 410a might comprise a first cache 415a, a first message bus 420a, and a plurality of first listening ports 425a, and so on. System 400 or 400' might further comprise a plurality of application programming interfaces ("APIs") 430 communicatively coupling the one or more client devices 405 and the DDSs 410, relaying requests from the client devices 405 to the DDSs 410 while relaying responses back from the DDSs 410 to the client devices 405.

In operation, a user, using a first client device 405a, might send a first request for data. A first DDS 410a might receive the first request from the first client device 405a via an API 430. The first DDS 410a might determine whether a local cache 415a might contain data that is responsive to the received first request, by routing the first request through one or more first listening ports 425a via first message bus 420a. Based on a determination that the local cache 415a contains data that is responsive to the received first request, the first DDS 410a might retrieve the data that is responsive to the received first request, and might send the retrieved data to the first client device 405a via the first message bus 420a, the one or more first listening ports, and the API 430. On the other hand, based on a determination that the local cache 415a does not contain data that is responsive to the received first request, the first DDS 410a might send, to a blockchain system 440 or 440' via one or more decentralized applications ("DApps") 435 among a plurality of DApps (which might include, but is not limited to, a domain name system ("DNS") DApp 435a, a transportation data DApp 435b (e.g., airline data DApp, bus data DApp, train data DApp, etc.), a webpage information DApp 435c, an equipment service information DApp 435d, a record request DApp 435e, a service provider customer data DApp 435f, and/or the like), a second request for identifying a blockchain (one or more of blockchains 445 of network(s) 450) containing a block containing data responsive to the received first request. In response to the blockchain system 440 or 440' identifying a blockchain 445 containing a block containing data responsive to the received first request, the first DDS 410a or the blockchain system 440 or 440' might receive a copy of the identified blockchain from the blockchain system 440 or 440'. The first DDS 410a or the blockchain system 440 or 440' might abstract, from the identified blockchain 445, the block containing the data responsive to the received first request; might abstract, from the identified block, the data responsive to the received first request; and might send the data to the first client device 405a via the one or more DApps 435, the first message bus 420a (and in some cases, via the first cache 415a, or the like), the one or more first listening ports 425a, and the API 430.

According to some embodiments, the first request might comprise a DNS request, where the data that is responsive to the received first request might comprise a DNS response comprising an Internet protocol ("IP") address associated with a website. In such cases, sending the second request to the blockchain system 440 or 440' might comprise sending, with the first DDS 410a and to the blockchain system 440 or 440', the second request via a DNS DApp (e.g., DNS DApp 435a, or the like). In some embodiments, the first request might comprise a hypertext transfer protocol ("HTTP") record request, where the data that is responsive to the received first request might comprise a JavaScript object notation ("JSON") record response. In such cases, sending the second request to the blockchain system 440 or 440' might comprise sending, with the first DDS 410a and to the blockchain system 440 or 440', the second request via a record request DApp (e.g., record request DApp 435e, or the like).

In some embodiments, the first request might include, but is not limited to, one of service provider customer data, webpage information, or equipment service information, and/or the like. In some cases, sending the second request to the blockchain system 440 or 440' might comprise sending, with the first DDS 410a and to the blockchain system 440 or 440', the second request via corresponding one of a service provider customer data DApp (e.g., service provider customer data DApp 435f, or the like), a webpage information DApp (e.g., webpage information DApp 435c, or the like), or an equipment service information DApp (e.g., equipment service information DApp 435d, or the like), and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system 440 or 440', in one or more first blocks of a first blockchain. In some instances, the usage data for the network device and the geolocation information for the network device might be abstracted from usage data records and stored, via the blockchain system 440 or 440', in one or more second blocks of a second blockchain. Alternatively, or additionally, the data control information for the network device might be abstracted from application programming interface ("API") calls and stored, via the blockchain system 440 or 440', in one or more third blocks of a third blockchain. Alternatively, or additionally, the information regarding critical events associated with the network device might be abstracted from a simple network management protocol ("SNMP") events system and stored, via the blockchain system 440 or 440', in one or more fourth blocks of a fourth blockchain. Alternatively, or additionally, the information regarding open trouble tickets might be abstracted from a trouble tickets system and stored, via the blockchain system 440 or 440', in one or more fifth blocks of a fifth blockchain. Alternatively, or additionally, the information regarding data monetization for the network device might be abstracted from a network server and stored, via the blockchain system 440 or 440', in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

Referring to FIG. 4, in the non-limiting embodiment 400 of FIG. 4A, blockchain system 440 might comprise the blockchains 445 and the network(s) 450, while, in the non-limiting embodiment 400' of FIG. 4B, blockchain system 440' might comprise the blockchains 445, the network (s) 450, and the plurality of DApps 435.

Figure 5A:
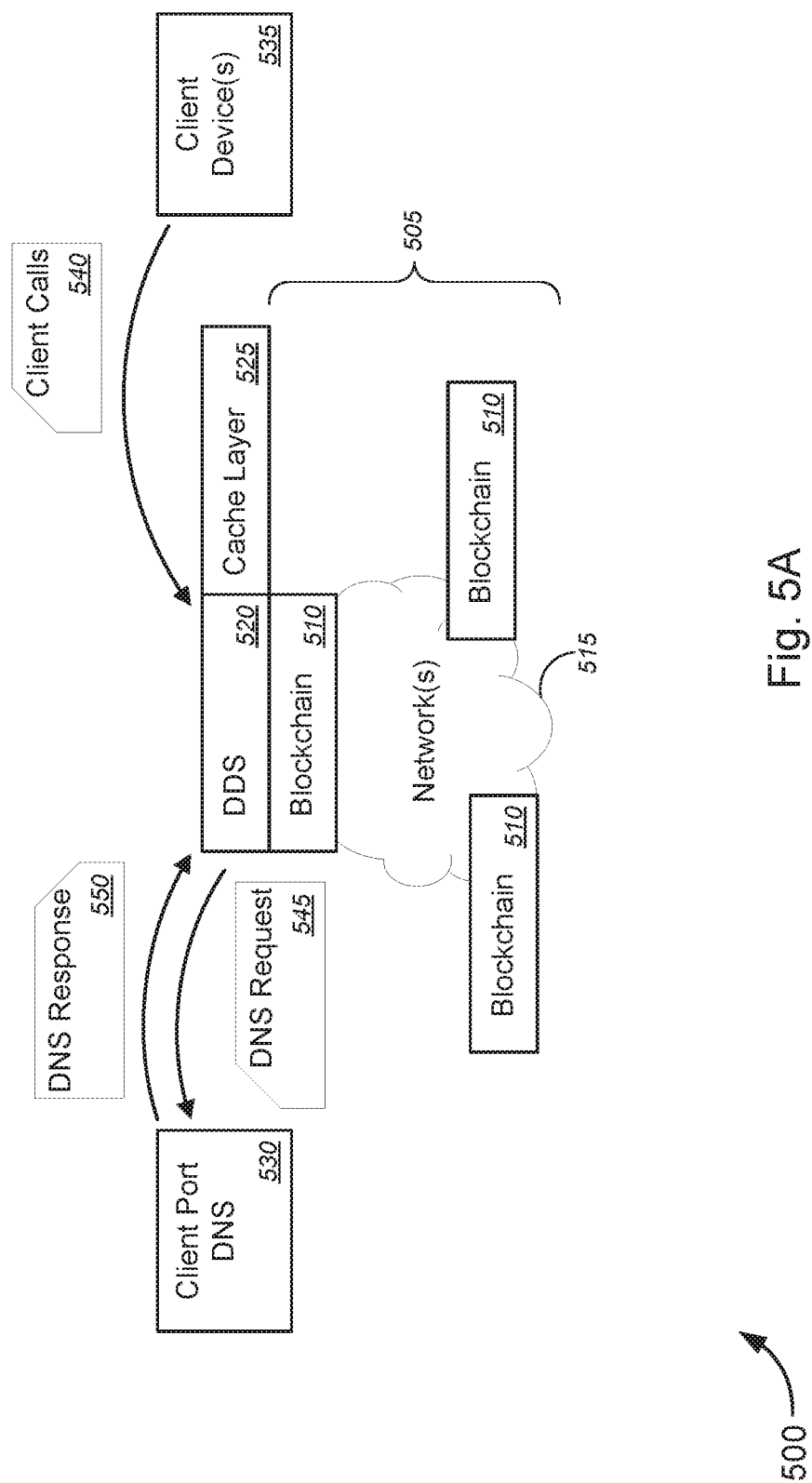
FIGS. 5A and 5B are schematic diagrams illustrating various embodiments for still another system for utilizing blockchains to implement named data networking, in accordance with various embodiments.
Figure 5B:
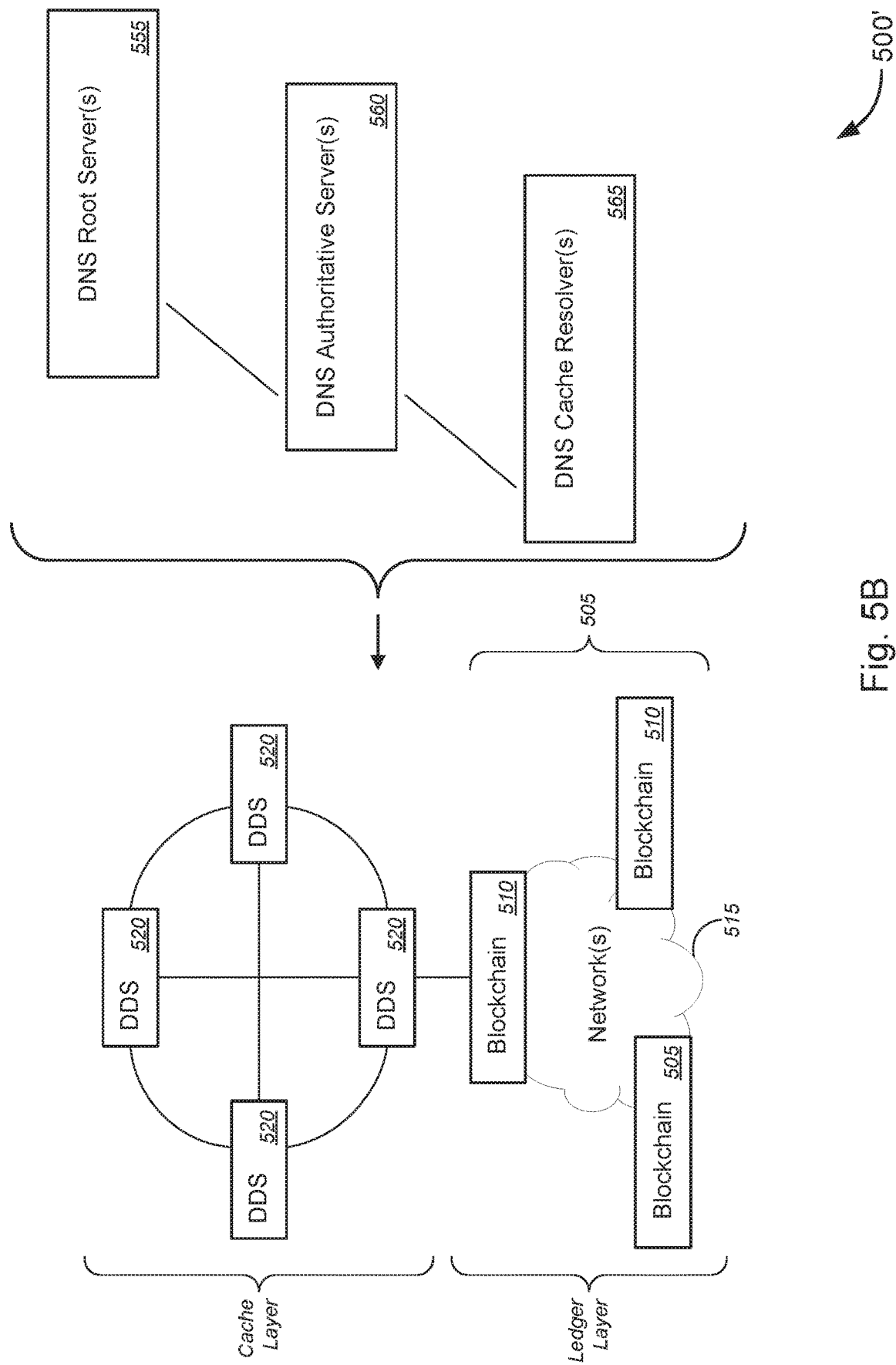

FIGS. 5A and 5B (collectively, "FIG. 5") are schematic diagrams illustrating various embodiments 500 and 500' for still another system for utilizing blockchains to implement named data networking, in accordance with various embodiments.

In the non-limiting embodiment of FIG. 5A, system 500 might comprise a blockchain system 505, which might comprise a plurality of blockchains 510 in network(s) 515. System 500 might comprise at least one data dissemination system ("DDS") 520, a cache layer 525, a client port domain name system ("DNS") 530, and a client device(s) 535.

In operation, a user, using client device(s) 535, might send a first request for data (e.g., client call(s) 540, or the like). In some cases, the DDS 520 might receive the first request (e.g., client call(s) 540, or the like) from the client device(s) 535 via an API or the like (e.g., API 430 of FIG. 4, or the like). The DDS 520 might determine whether cache layer 525 might contain data that is responsive to the received first request (e.g., client call(s) 540, or the like). Based on a determination that cache layer 525 contains data that is responsive to the received first request (e.g., client call(s) 540, or the like), the DDS 520 might retrieve, from cache layer 525, the data that is responsive to the received first request (e.g., client call(s) 540, or the like), and might send the retrieved data to the client device(s) 535. On the other hand, based on a determination that cache layer 525 does not contain data that is responsive to the received first request (e.g., client call(s) 540, or the like), the DDS 520 might send, to a blockchain system 505 (in some cases, via one or more decentralized applications ("DApps"), or the like), a second request for identifying a blockchain (one or more of blockchains 510 of network(s) 515) containing a block containing data responsive to the received first request (e.g., client call(s) 540, or the like). In response to the blockchain system 505 identifying a blockchain 510 containing a block containing data responsive to the received first request (e.g., client call(s) 540, or the like), the DDS 520 or the blockchain system 505 might receive a copy of the identified blockchain from the blockchain system 505. The DDS 520 or the blockchain system 505 might abstract, from the identified blockchain 510, the block containing the data responsive to the received first request (e.g., client call(s) 540, or the like); might abstract, from the identified block, the data responsive to the received first request (e.g., client call(s) 540, or the like); and might send the data to the client device(s) 535.

According to some embodiments, the first request (e.g., client call(s) 540, or the like) might comprise a DNS request, where the data that is responsive to the received first request (e.g., client call(s) 540, or the like) might comprise a DNS response comprising an Internet protocol ("IP") address associated with a website. In such cases, sending the second request to the blockchain system 505 might comprise sending, with the DDS 520 and to the blockchain system 505, the second request via a DNS DApp (e.g., DNS DApp 435a of FIG. 4, or the like). In some embodiments, the first request (e.g., client call(s) 540, or the like) might comprise a hypertext transfer protocol ("HTTP") record request, where the data that is responsive to the received first request (e.g., client call(s) 540, or the like) might comprise a JavaScript object notation ("JSON") record response. In such cases, sending the second request to the blockchain system 505 might comprise sending, with the DDS 520 and to the blockchain system 505, the second request via a record request DApp (e.g., record request DApp 435e of FIG. 4, or the like).

In some embodiments, the first request (e.g., client call(s) 540, or the like) might include, but is not limited to, one of service provider customer data, webpage information, or equipment service information, and/or the like. In some cases, sending the second request to the blockchain system 505 might comprise sending, with the DDS 520 and to the blockchain system 505, the second request via corresponding one of a service provider customer data DApp (e.g., service provider customer data DApp 435f of FIG. 4, or the like), a webpage information DApp (e.g., webpage information DApp 435c of FIG. 4, or the like), or an equipment service information DApp (e.g., equipment service information DApp 435d of FIG. 4, or the like), and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request (e.g., client call(s) 540, or the like) might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system 505, in one or more first blocks of a first blockchain. In some instances, the usage data for the network device and the geolocation information for the network device might be abstracted from usage data records and stored, via the blockchain system 505, in one or more second blocks of a second blockchain. Alternatively, or additionally, the data control information for the network device might be abstracted from application programming interface ("API") calls and stored, via the blockchain system 505, in one or more third blocks of a third blockchain. Alternatively, or additionally, the information regarding critical events associated with the network device might be abstracted from a simple network management protocol ("SNMP") events system and stored, via the blockchain system 505, in one or more fourth blocks of a fourth blockchain. Alternatively, or additionally, the information regarding open trouble tickets might be abstracted from a trouble tickets system and stored, via the blockchain system 505, in one or more fifth blocks of a fifth blockchain. Alternatively, or additionally, the information regarding data monetization for the network device might be abstracted from a network server and stored, via the blockchain system 505, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

Turning to FIG. 5B, system 500' might comprise a blockchain system 505, which might comprise a plurality of blockchains 510 in network(s) 515. System 500' might comprise a plurality, array, or network of data dissemination systems ("DDSs") 520. Although not shown in FIG. 5B, each of one or more of the DDSs 520 might comprise a cache (not unlike cache layer 525 of system 500 of FIG. 5, or the like). The blockchain system 505 might constitute the ledger layer, while the array or network of DDSs 520 might constitute the cache layer.

Conventionally, DNS requests might be received by a DNS root server(s) (such as DNS root server(s) 555 as depicted in FIG. 5B, or the like), which might include one or more of the existing top-level world-wide root servers that control root domains or top-level domains, or the like. In response to receiving the DNS requests, the DNS root server(s) (e.g., DNS root server(s) 555, or the like) might return a list of DNS authoritative name servers (e.g., DNS authoritative server(s) 560 as depicted in FIG. 5B, or the like) for appropriate top-level domains ("TLD"). At least one DNS authoritative name servers of the listed DNS authoritative name servers (e.g., DNS authoritative server(s) 560, or the like) might either provide authoritative answers to queries in corresponding zones covered by each of the at least one DNS authoritative name servers or act as a caching name server for all other zones. One or more DNS cache resolvers (e.g., DNS cache resolver(s) 565 as depicted in FIG. 5B, or the like) might perform table lookups to resolve any domain names that have not already been retrieved from caches, and subsequently converting the domain names in the DNS requests into IP addresses, based on the table lookups.

Rather than processing DNS requests in such conventional ways, system 500' of FIG. 5B might perform functions similar to system 500 of FIG. 5A. In particular, the plurality, array, or network of DDSs 520 might receive a first request (e.g., a DNS request(s), or the like) from a user (e.g., via client device(s) associated with the user via an API or the like (e.g., API 430 of FIG. 4, or the like). The plurality, array, or network of DDSs 520 might determine whether a cache layer might contain data that is responsive to the received first request (e.g., DNS request(s), or the like). Based on a determination that the cache layer contains data that is responsive to the received first request (e.g., DNS request(s), or the like), the plurality, array, or network of DDS 520 might retrieve, from the cache layer, the data that is responsive to the received first request (e.g., DNS request(s), or the like), and might send the retrieved data to the client device (s). On the other hand, based on a determination that the cache layer does not contain data that is responsive to the received first request (e.g., DNS request(s), or the like), the plurality, array, or network of DDSs 520 might send, to a blockchain system 505 (in some cases, via one or more decentralized applications ("DApps"), or the like), a second request for identifying a blockchain (one or more of blockchains 510 of network(s) 515) containing a block containing data responsive to the received first request (e.g., DNS request(s), or the like). In response to the blockchain system 505 identifying a blockchain 510 containing a block containing data responsive to the received first request (e.g., DNS request(s), or the like), the plurality, array, or network of DDSs 520 or the blockchain system 505 might receive a copy of the identified blockchain from the blockchain system 505. The plurality, array, or network of DDSs 520 or the blockchain system 505 might abstract, from the identified blockchain 510, the block containing the data responsive to the received first request (e.g., DNS request(s), or the like); might abstract, from the identified block, the data responsive to the received first request (e.g., DNS request(s), or the like); and might send the data to the client device(s).

According to some embodiments, the first request (e.g., DNS request(s), or the like) might comprise a DNS request, where the data that is responsive to the received first request (e.g., DNS request(s), or the like) might comprise a DNS response comprising an Internet protocol ("IP") address associated with a website. In such cases, sending the second request to the blockchain system 505 might comprise sending, with the plurality, array, or network of DDSs 520 and to the blockchain system 505, the second request via a DNS DApp (e.g., DNS DApp 435a of FIG. 4, or the like). In some embodiments, the first request (e.g., DNS request(s), or the like) might comprise a hypertext transfer protocol ("HTTP") record request, where the data that is responsive to the received first request (e.g., DNS request(s), or the like) might comprise a JavaScript object notation ("JSON") record response. In such cases, sending the second request to the blockchain system 505 might comprise sending, with the plurality, array, or network of DDSs 520 and to the blockchain system 505, the second request via a record request DApp (e.g., record request DApp 435e of FIG. 4, or the like).

In some embodiments, rather than DNS requests, the first request might comprise other types of data requests. For example, the first request (e.g., DNS request(s), or the like) might include, but is not limited to, one of service provider customer data, webpage information, or equipment service information, and/or the like. In some cases, sending the second request to the blockchain system 505 might comprise sending, with the plurality, array, or network of DDSs 520 and to the blockchain system 505, the second request via corresponding one of a service provider customer data DApp (e.g., service provider customer data DApp 435f of FIG. 4, or the like), a webpage information DApp (e.g., webpage information DApp 435c of FIG. 4, or the like), or an equipment service information DApp (e.g., equipment service information DApp 435d of FIG. 4, or the like), and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system 505, in one or more first blocks of a first blockchain. In some instances, the usage data for the network device and the geolocation information for the network device might be abstracted from usage data records and stored, via the blockchain system 505, in one or more second blocks of a second blockchain. Alternatively, or additionally, the data control information for the network device might be abstracted from application programming interface ("API") calls and stored, via the blockchain system 505, in one or more third blocks of a third blockchain. Alternatively, or additionally, the information regarding critical events associated with the network device might be abstracted from a simple network management protocol ("SNMP") events system and stored, via the blockchain system 505, in one or more fourth blocks of a fourth blockchain. Alternatively, or additionally, the information regarding open trouble tickets might be abstracted from a trouble tickets system and stored, via the blockchain system 505, in one or more fifth blocks of a fifth blockchain. Alternatively, or additionally, the information regarding data monetization for the network device might be abstracted from a network server and stored, via the blockchain system 505, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

Figure 6A:
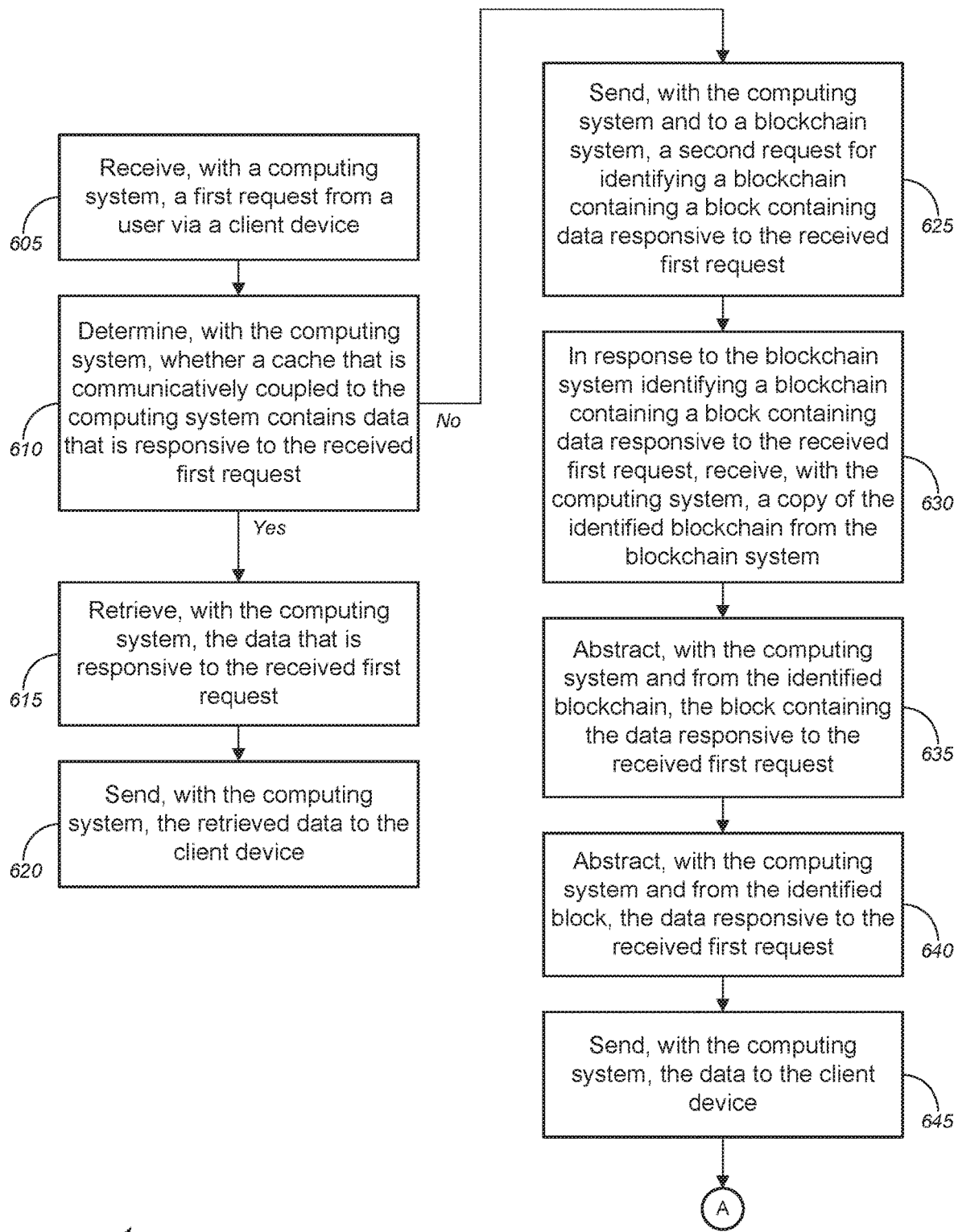
FIGS. 6A-6C are flow diagrams illustrating a method for utilizing blockchains to implement named data networking, in accordance with various embodiments.
Figure 6B:
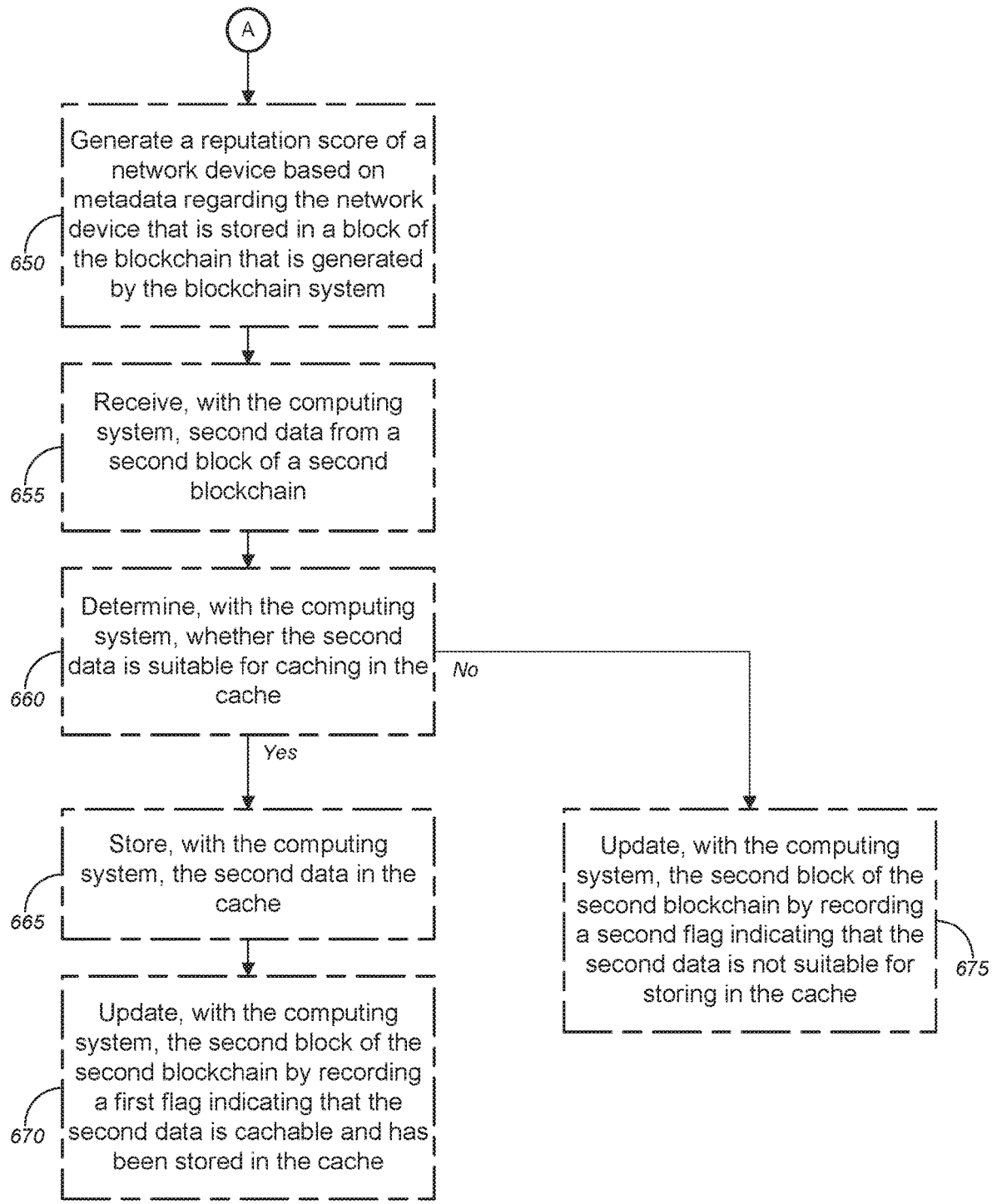
Figure 6C:
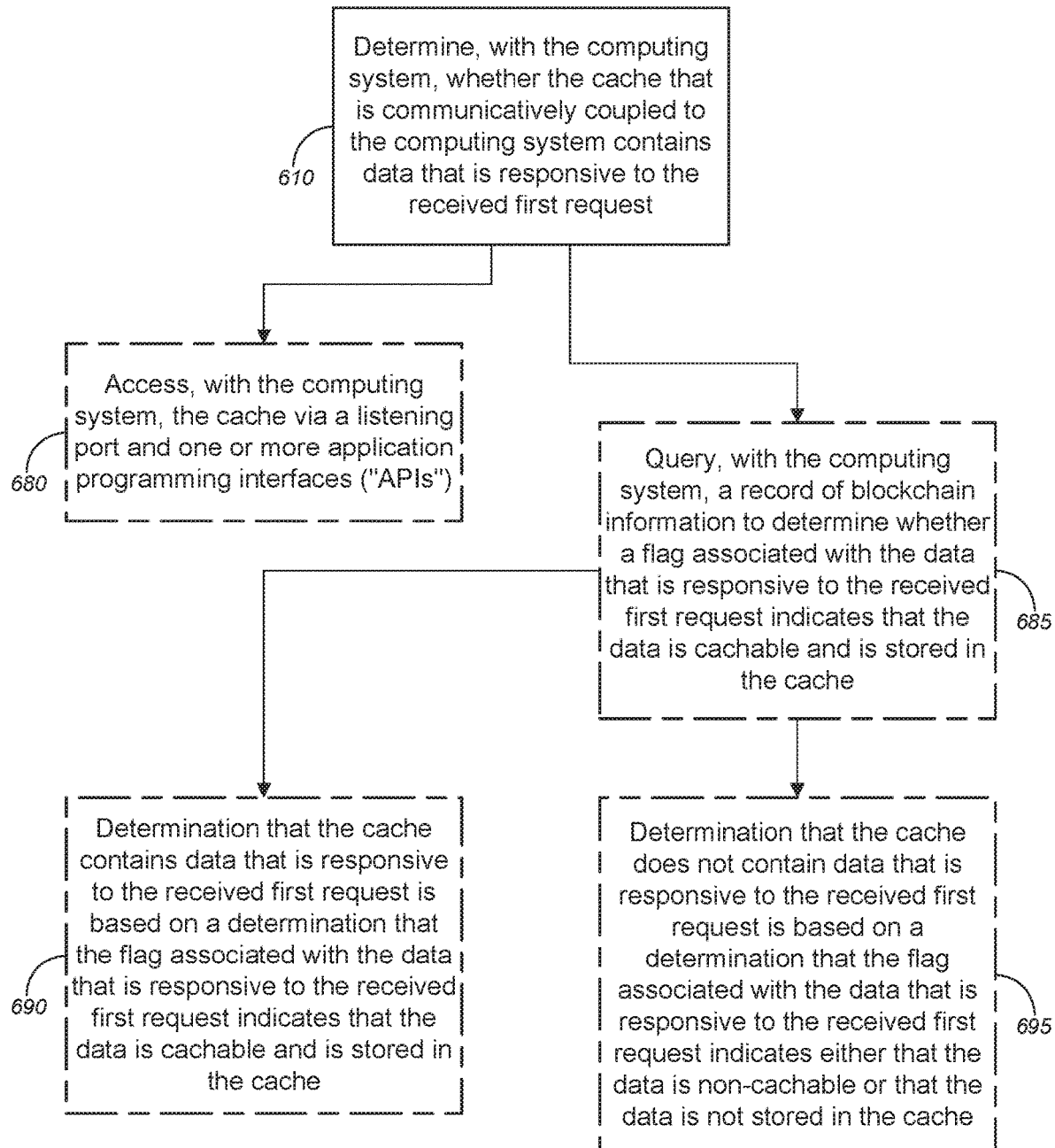

FIGS. 6A-6C (collectively, "FIG. 6") are flow diagrams illustrating a method 600 for utilizing blockchains to implement named data networking, in accordance with various embodiments. Method 600 of FIG. 6A continues onto FIG. 6B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems, examples, or embodiments 100, 200, 300, 400, 400', 500, and 500' of FIGS. 1, 2, 3, 4A, 4B, 5A, and 5B, respectively (or components thereof), such methods may also be implemented using any suitable hardware (or software) implementation. Similarly, while each of the systems, examples, or embodiments 100, 200, 300, 400, 400', 500, and 500' of FIGS. 1, 2, 3, 4A, 4B, 5A, and 5B, respectively (or components thereof), can operate according to the method 600 illustrated by FIG. 6 (e.g., by executing instructions embodied on a computer readable medium), the systems, examples, or embodiments 100, 200, 300, 400, 400', 500, and 500' of FIGS. 1, 2, 3, 4A, 4B, 5A, and 5B can each also operate according to other modes of operation and/or perform other suitable procedures.

In the non-limiting embodiment of FIG. 6A, method 600, at block 605, might comprise receiving, with a computing system, a first request from a user via a client device. In some embodiments, the computing system might include, without limitation, one of a data dissemination system, a named data system, a server computer, a cloud-based computing system over a network, or a distributed computing system, and/or the like. In some cases, the client device might include, but is not limited to, one of a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like.

Method 600 might further comprise determining, with the computing system, whether a cache that is communicatively coupled to the computing system contains data that is responsive to the received first request (block 610). If so, method 600 might continue to the process at block 615. If not, the method 600 might proceed to the process at block 625. At block 615, method 600 might comprise, based on a determination that the cache contains data that is responsive to the received first request, retrieving, with the computing system, the data that is responsive to the received first request. Method 600 might further comprise, at block 620, sending, with the computing system, the retrieved data to the client device.

At block 625, method 600 might comprise, based on a determination that the cache does not contain data that is responsive to the received first request, sending, with the computing system and to a blockchain system, a second request for identifying a blockchain containing a block containing data responsive to the received first request. Method 600 might further comprise, in response to the blockchain system identifying a blockchain containing a block containing data responsive to the received first request, performing the following: receiving, with the computing system, a copy of the identified blockchain from the blockchain system (block 630); abstracting, with the computing system and from the identified blockchain, the block containing the data responsive to the received first request (block 635); abstracting, with the computing system and from the identified block, the data responsive to the received first request (block 640); and sending, with the computing system, the data to the client device (block 645). Method 600 might continue onto the process at optional block 650 in FIG. 6B following the circular marker denoted, "A."

At optional block 650 in FIG. 6B (following the circular marker denoted, "A"), method 600 might comprise generating a reputation score of a network device based on metadata regarding the network device that is stored in a block of the blockchain that is generated by the blockchain system, wherein the first request comprises a request for the reputation score of the network device. Method 600 might further comprise, at optional block 655, receiving, with the computing system, second data from a second block of a second blockchain. At optional block 660, method 600 might comprise determining, with the computing system, whether the second data is (or is not) suitable for caching in the cache. If so, method 600 might continue to the process at optional block 665. If not, the method 600 might proceed to the process at optional block 675. At optional block 665, method 600 might comprise, based on a determination that the second data is suitable for caching in the cache, storing, with the computing system, the second data in the cache. Method 600 might further comprise, at optional block 670, updating, with the computing system, the second block of the second blockchain by recording a first flag indicating that the second data is cachable and has been stored in the cache. At optional block 675, method 600 might comprise, based on a determination that the second data is not suitable for caching in the cache, updating, with the computing system, the second block of the second blockchain by recording a second flag indicating that the second data is not suitable for storing in the cache.

With reference to FIG. 6C, determining whether the cache that is communicatively coupled to the computing system contains data that is responsive to the received first request (at block 610) might comprise accessing, with the computing system, the cache via a listening port and one or more application programming interfaces ("APIs") (optional block 680). Alternatively, or additionally, determining whether the cache that is communicatively coupled to the computing system contains data that is responsive to the received first request (at block 610) might comprise querying, with the computing system, a record of blockchain information to determine whether a flag associated with the data that is responsive to the received first request indicates that the data is cachable and is stored in the cache (optional block 685). In some cases, the determination that the cache contains data that is responsive to the received first request might be based on a determination that the flag associated with the data that is responsive to the received first request indicates that the data is cachable and is stored in the cache (optional block 690), while the determination that the cache does not contain data that is responsive to the received first request might be based on a determination that the flag associated with the data that is responsive to the received first request indicates either that the data is non-cachable or that the data is not stored in the cache (optional block 695).

In some embodiments, rather than retrieving the data that is responsive to the received first request based on a determination that the cache contains data that is responsive to the received first request, the computing system might first perform verification or authentication tests, including, but not limited to, tests based on time to live ("TTL") analysis to determine timestamps indicating when such data was stored in the cache and to determine what such data's TTL might be (e.g., 1 hour, 1 day, 1 week, 1 month, etc.). Based on a determination that such data was stored for a period exceeding its TTL, then such data may be considered to be untrustworthy, and the computing system might determine that the cache does not contain data that is responsive to the received first request (and thus might send the second request to the blockchain system, as described in detail above). On the other hand, based on a determination that such data was stored for a period within its TTL, then the computing system might consider such data to be trustworthy, and might proceed to retrieve the data from the cache and might send the retrieved data to the client device.

According to some embodiments, the first request might comprise a domain name system ("DNS") request, where the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp"). In some embodiments, the first request might comprise a hypertext transfer protocol ("HTTP") record request, where the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might include, but is not limited to, one of service provider customer data, webpage information, or equipment service information, and/or the like. In some cases, sending the second request to the blockchain system might comprise sending, with the computing system and to the blockchain system, the second request via corresponding one of a service provider customer data DApp, a webpage information DApp, or an equipment service information DApp, and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system, in one or more first blocks of a first blockchain. In some instances, the usage data for the network device and the geolocation information for the network device might be abstracted from usage data records and stored, via the blockchain system, in one or more second blocks of a second blockchain. Alternatively, or additionally, the data control information for the network device might be abstracted from application programming interface ("API") calls and stored, via the blockchain system, in one or more third blocks of a third blockchain. Alternatively, or additionally, the information regarding critical events associated with the network device might be abstracted from a simple network management protocol ("SNMP") events system and stored, via the blockchain system, in one or more fourth blocks of a fourth blockchain. Alternatively, or additionally, the information regarding open trouble tickets might be abstracted from a trouble tickets system and stored, via the blockchain system, in one or more fifth blocks of a fifth blockchain. Alternatively, or additionally, the information regarding data monetization for the network device might be abstracted from a network server and stored, via the blockchain system, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

Exemplary System and Hardware Implementation

Figure 7:
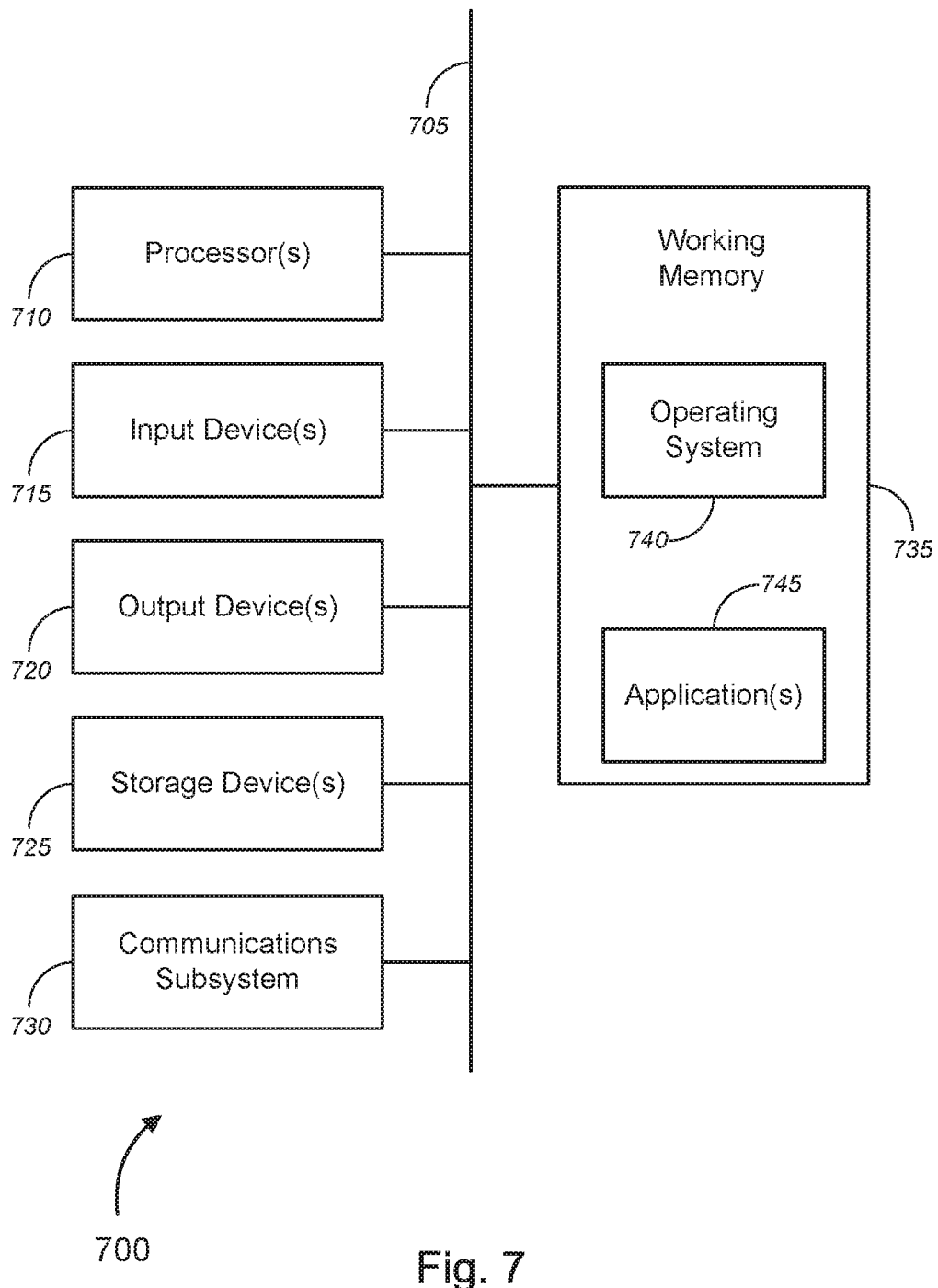
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., computing system 105, client devices 115a-115n and 405a-405n, blockchain systems 130, 345, 440, 440', and 505, blockchain computing system 135, named data system 305, data dissemination systems ("DDSs") 410a-410n and 520, decentralized applications ("DApps") 435a-435f, Client Port Domain Name System ("DNS") 530, DNS Root 540, DNS Authoritative Server(s) 545, DNS Cache Resolver(s) 550, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., computing system 105, client devices 115a-115n and 405a-405n, blockchain systems 130, 345, 440, and 505, blockchain computing system 135, named data system 305, DDSs 410a-410n and 520, DApps 435a-435f, Client Port DNS 530, DNS Root 540, DNS Authoritative Server(s) 545, DNS Cache Resolver(s) 550, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
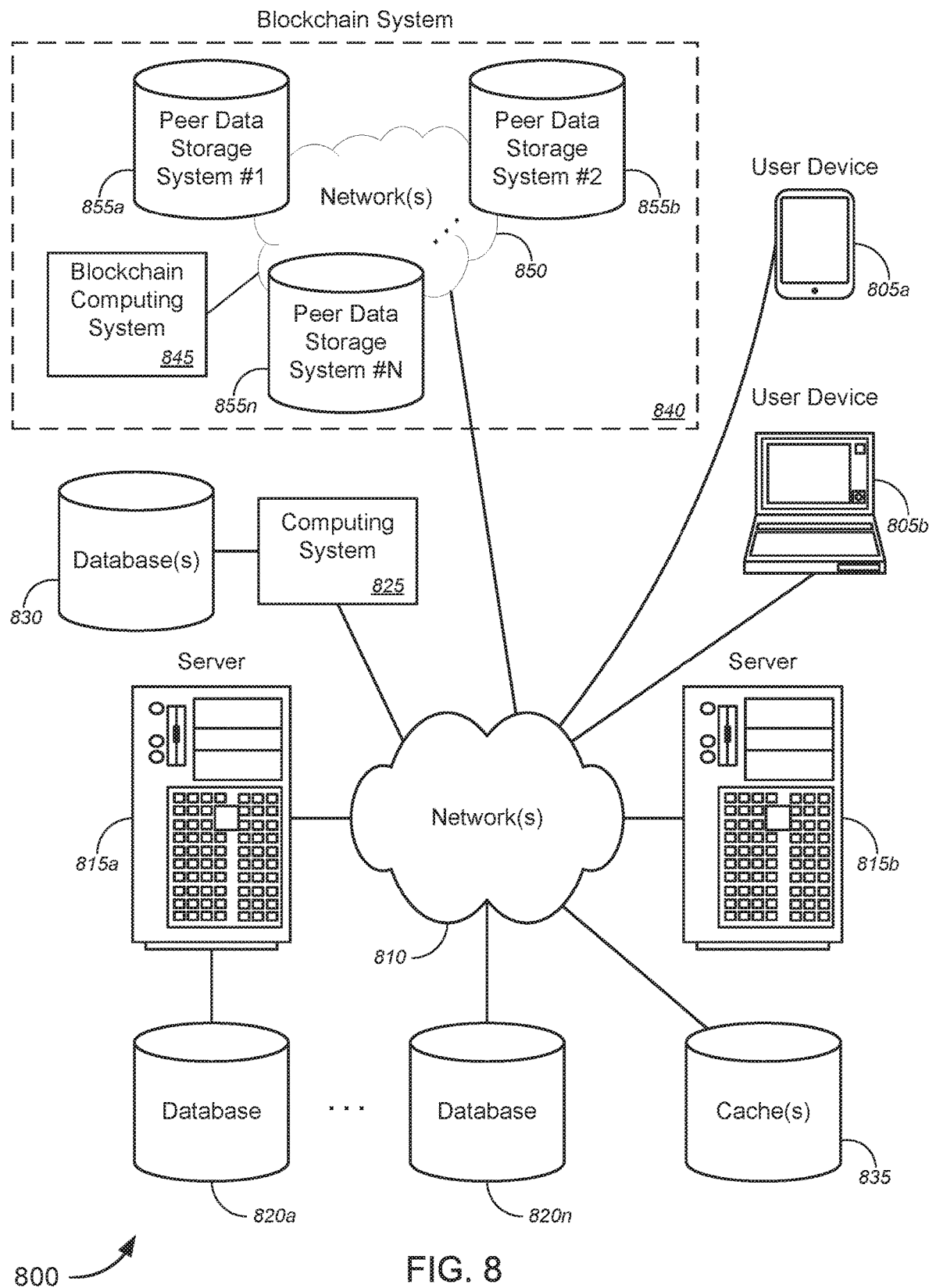
FIG. 8 is a block diagram illustrating a networked system of computers, computing systems, or system hardware architecture, which can be used in accordance with various embodiments.

As noted above, a set of embodiments comprises methods and systems for implementing named data networking, and, more particularly, to methods, systems, and apparatuses for utilizing blockchains to implement named data networking. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 (similar to network(s) 120, 140, 450, and 515 of FIGS. 1, 4, and 5, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing named data networking, and, more particularly, to methods, systems, and apparatuses for utilizing blockchains to implement named data networking, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (and/or a user computer, user device, or customer device 805). Alternatively, a database 820n can be remote from any or all of the computers 805, 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a computing system 825 and corresponding database(s) 830 (similar to computing system 105 and corresponding database(s) 110 of FIG. 1, or the like). System 800 might further comprise cache(s) 835 (similar to cache(s) 125, 415, and 525, or metadata records 350 of FIGS. 1, 3, 4, and 5, or the like). System 800 might further comprise a blockchain system 840 (similar to blockchain systems 130, 345, 440, and 505 of FIGS. 1, 3, 4, and 5, or the like), which might comprise a blockchain computing system 845 (similar to blockchain systems 130, 345, 440, and 505 of FIGS. 1, 3, 4, and 5, or the like), one or more peer data storage systems #1-#N 855a-855n (collectively, "peer data storage systems 855" or the like; similar to peer data storage systems 145a-145n of FIG. 1, or the like), and network(s) 850 (similar to networks 140, 450, and 515 of FIGS. 1, 4, and 5, or the like).

In operation, computing system 825 might receive a first request from a user via a client device (i.e., one of the client devices or user devices 805a or 805b, or the like), might determine whether a cache (e.g., cache(s) 835, or the like) that is communicatively coupled to the computing system 825 contains data that is responsive to the received first request. Based on a determination that the cache contains data that is responsive to the received first request, computing system 825 might retrieve the data that is responsive to the received first request, and might send the retrieved data to the client device. On the other hand, based on a determination that the cache does not contain data that is responsive to the received first request, computing system 825 might send, to a blockchain system (e.g., blockchain system 840 or blockchain computing system 845 of blockchain system 840, or the like), a second request for identifying a blockchain containing a block containing data responsive to the received first request.

In response to the blockchain system (e.g., blockchain system 840 or blockchain computing system 845 of blockchain system 840, or the like) identifying a blockchain (such as blockchain 205 of FIG. 2, or the like) containing a block containing data responsive to the received first request, computing system 825 (or blockchain computing system 845) might receive a copy of the identified blockchain from the blockchain system; might abstract, from the identified blockchain, the block containing the data responsive to the received first request; might abstract, from the identified block, the data responsive to the received first request; and might send the data to the client device.

According to some embodiments, the first request might comprise a domain name system ("DNS") request, where the data that is responsive to the received first request might comprise a DNS response comprising an Internet protocol ("IP") address associated with a website. In such cases, sending the second request to the blockchain system might comprise sending, with the computing system and to the blockchain system, the second request via a DNS decentralized application ("DApp"). In some embodiments, the first request might comprise a hypertext transfer protocol ("HTTP") record request, where the data that is responsive to the received first request might comprise a JavaScript object notation ("JSON") record response. In such cases, sending the second request to the blockchain system might comprise sending, with the computing system and to the blockchain system, the second request via a record request DApp.

In some embodiments, the first request might include, but is not limited to, one of service provider customer data, webpage information, or equipment service information, and/or the like. In some cases, sending the second request to the blockchain system might comprise sending, with the computing system 825 and to the blockchain system 840, the second request via corresponding one of a service provider customer data DApp, a webpage information DApp, or an equipment service information DApp, and/or the like. In some instances, the service provider customer data might include, without limitation, one of customer data associated with Internet service, customer data associated with transportation service, customer data associated with cellular communications service, customer data associated with data services, or customer data associated with media content services, and/or the like.

According to some embodiments, the first request might include, but is not limited to, a request for information regarding a network device. In some instances, metadata regarding the network device might be contained in the block of the identified blockchain, where the metadata might include, without limitation, at least one of service information for the network device, maintenance information for the network device, usage data for the network device, geolocation information for the network device, data control information for the network device, information regarding critical events associated with the network device, information regarding open trouble tickets, or information regarding data monetization for the network device, and/or the like. In some cases, the service information for the network device and the maintenance information for the network device might be abstracted from service records and stored, via the blockchain system, in one or more first blocks of a first blockchain. In some instances, the usage data for the network device and the geolocation information for the network device might be abstracted from usage data records and stored, via the blockchain system, in one or more second blocks of a second blockchain. Alternatively, or additionally, the data control information for the network device might be abstracted from application programming interface ("API") calls and stored, via the blockchain system, in one or more third blocks of a third blockchain. Alternatively, or additionally, the information regarding critical events associated with the network device might be abstracted from a simple network management protocol ("SNMP") events system and stored, via the blockchain system, in one or more fourth blocks of a fourth blockchain. Alternatively, or additionally, the information regarding open trouble tickets might be abstracted from a trouble tickets system and stored, via the blockchain system, in one or more fifth blocks of a fifth blockchain. Alternatively, or additionally, the information regarding data monetization for the network device might be abstracted from a network server and stored, via the blockchain system, in one or more sixth blocks of a sixth blockchain. In some embodiments, two or more of the first blockchain, the second blockchain, third blockchain, fourth blockchain, fifth blockchain, or sixth blockchain might be the same blockchain. In some cases, two or more of the one or more first blocks, the one or more second blocks, the one or more third blocks, the one or more fourth blocks, the one or more fifth blocks, or the one or more sixth blocks might be the same one or more blocks.

These and other functions of the system 800 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system, a first request from a user via a client device;
   determining, with the computing system, whether a cache that is communicatively coupled to the computing system contains data that is responsive to the received first request;
   based on a determination that the cache contains data that is responsive to the received first request, retrieving, with the computing system, the data that is responsive to the received first request, and sending, with the computing system, the retrieved data to the client device;
   based on a determination that the cache does not contain data that is responsive to the received first request, sending, with the computing system and to a blockchain system, a second request for identifying a blockchain containing a block containing data responsive to the received first request; and
   in response to the blockchain system identifying the blockchain containing the block containing data responsive to the received first request, performing the following:
   receiving, with the computing system, a copy of the identified blockchain from the blockchain system; abstracting, with the computing system and from the identified blockchain, the block containing the data responsive to the received first request; abstracting, with the computing system and from the identified block, the data responsive to the received first request; and
   sending, with the computing system, the data to the client device.

2. The method of claim 1, wherein the computing system comprises one of a data dissemination system, a named data system, a server computer, a cloud-based computing system over a network, or a distributed computing system.

3. The method of claim 1, wherein the client device comprises one of a laptop computer, a desktop computer, a tablet computer, a television set, a smart television, a media player, a gaming console, a set-top box ("STB"), a digital video recording ("DVR") device, a smart phone, a mobile phone, or a personal digital assistant.

4. The method of claim 1, wherein the first request comprises a domain name system ("DNS") request, wherein the data that is responsive to the received first request comprises a DNS response comprising an Internet protocol ("IP") address associated with a website.

5. The method of claim 4, wherein sending the second request to the blockchain system comprises sending, with the computing system and to the blockchain system, the second request via a DNS decentralized application ("DApp").

6. The method of claim 1, wherein the first request comprises a hypertext transfer protocol ("HTTP") record request, wherein the data that is responsive to the received first request comprises a JavaScript object notation ("JSON") record response.

7. The method of claim 6, wherein sending the second request to the blockchain system comprises sending, with the computing system and to the blockchain system, the second request via a record request DApp.

8. The method of claim 1, wherein the first request comprises one of service provider customer data, webpage information, or equipment service information, wherein sending the second request to the blockchain system comprises sending, with the computing system and to the blockchain system, the second request via corresponding one of a service provider customer data DApp, a webpage information DApp, or an equipment service information DApp, wherein the service provider customer data comprises one of customer data associated with Internet service, customer data associated with transportation service, customer data associated with cellular communications service, customer data associated with data services, or customer data associated with media content services.

9. The method of claim 1, wherein the first request comprises a request for information regarding a network device, wherein metadata regarding the network device is contained in the block of the identified blockchain, wherein the metadata comprises at least one of service information for the network device, maintenance information for the network device, usage data for the network device, geolocation information for the network device, data control information for the network device, information regarding critical events associated with the network device, information regarding open trouble tickets, or information regarding data monetization for the network device, wherein the service information for the network device and the maintenance information for the network device are abstracted from service records and stored, via the blockchain system, in one or more first blocks of a first blockchain, wherein the usage data for the network device and the geolocation information for the network device are abstracted from usage data records and stored, via the blockchain system, in one or more second blocks of a second blockchain, wherein the data control information for the network device is abstracted from application programming interface ("API") calls and stored, via the blockchain system, in one or more third blocks of a third blockchain, wherein the information regarding critical events associated with the network device is abstracted from a simple network management protocol ("SNMP") events system and stored, via the blockchain system, in one or more fourth blocks of a fourth blockchain, wherein the information regarding open trouble tickets is abstracted from a trouble tickets system and stored, via the blockchain system, in one or more fifth blocks of a fifth blockchain, and wherein the information regarding data monetization for the network device is abstracted from a network server and stored, via the blockchain system, in one or more sixth blocks of a sixth blockchain.

10. The method of claim 9, wherein two or more of the first blockchain, the second blockchain, third blockchain, fourth blockchain, fifth blockchain, or sixth blockchain are the same blockchain, wherein two or more of the one or more first blocks, the one or more second blocks, the one or more third blocks, the one or more fourth blocks, the one or more fifth blocks, or the one or more sixth blocks are the same one or more blocks.

11. The method of claim 1, further comprising:
generating a reputation score of a network device based on metadata regarding the network device that is stored in a block of the blockchain that is generated by the blockchain system, wherein the first request comprises a request for the reputation score of the network device.

12. The method of claim 1, wherein determining, with the computing system, whether the cache that is communicatively coupled to the computing system contains data that is responsive to the received first request comprises accessing, with the computing system, the cache via a listening port and one or more application programming interfaces ("APIs").

13. The method of claim 1, wherein determining whether the cache that is communicatively coupled to the computing system contains data that is responsive to the received first request comprises:
querying, with the computing system, a record of blockchain information to determine whether a flag associated with the data that is responsive to the received first request indicates that the data is cachable and is stored in the cache;
wherein the determination that the cache contains data that is responsive to the received first request is based on a determination that the flag associated with the data that is responsive to the received first request indicates that the data is cachable and is stored in the cache; and
wherein the determination that the cache does not contain data that is responsive to the received first request is based on a determination that the flag associated with the data that is responsive to the received first request indicates either that the data is non-cachable or that the data is not stored in the cache.

14. The method of claim 1, further comprising:
receiving, with the computing system, second data from a second block of a second blockchain;
determining, with the computing system, whether the second data is or is not suitable for caching in the cache;
based on a determination that the second data is suitable for caching in the cache, storing, with the computing system, the second data in the cache, and updating, with the computing system, the second block of the second blockchain by recording a first flag indicating that the second data is cachable and has been stored in the cache; and
based on a determination that the second data is not suitable for caching in the cache, updating, with the computing system, the second block of the second blockchain by recording a second flag indicating that the second data is not suitable for storing in the cache.

15. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
receive a first request from a user via a client device;
determine whether a cache that is communicatively coupled to the computing system contains data that is responsive to the received first request;
based on a determination that the cache contains data that is responsive to the received first request, retrieve the data that is responsive to the received first request, and send the retrieved data to the client device;
based on a determination that the cache does not contain data that is responsive to the received first request, send, to a blockchain system, a second request for identifying a blockchain containing a block containing data responsive to the received first request; and
in response to the blockchain system identifying the blockchain containing the block containing data responsive to the received first request, performing the following:

receiving a copy of the identified blockchain from the blockchain system; abstracting, from the identified blockchain, the block containing the data responsive to the received first request; abstracting, from the identified block, the data responsive to the received first request; and sending the data to the client device.

16. The apparatus of claim 15, wherein the apparatus comprises one of a data dissemination system, a named data system, a server computer, a cloud-based computing system over a network, or a distributed computing system.

17. The apparatus of claim 15, wherein the client device comprises one of a laptop computer, a desktop computer, a tablet computer, a television set, a smart television, a media player, a gaming console, a set-top box ("STB"), a digital video recording ("DVR") device, a smart phone, a mobile phone, or a personal digital assistant.

18. The apparatus of claim 15, wherein the first request comprises a domain name system ("DNS") request, wherein the data that is responsive to the received first request comprises a DNS response comprising an Internet protocol ("IP") address associated with a website.

19. The apparatus of claim 15, wherein determining, with the computing system, whether a cache that is communicatively coupled to the computing system contains data that is responsive to the received first request comprises accessing, with the computing system, the cache via a listening port and one or more application programming interfaces ("APIs").

20. A system, comprising:
a computing system, comprising: at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive a first request from a user via a client device;

determine whether a cache that is communicatively coupled to the computing system contains data that is responsive to the received first request;

based on a determination that the cache contains data that is responsive to the received first request, retrieve the data that is responsive to the received first request, and send the retrieved data to the client device;

based on a determination that the cache does not contain data that is responsive to the received first request, send, to a blockchain system, a second request for identifying a blockchain containing a block containing data responsive to the received first request; and in response to the blockchain system identifying the blockchain containing the block containing data responsive to the received first request, performing the following:

receiving a copy of the identified blockchain from the blockchain system; abstracting, from the identified blockchain, the block containing the data responsive to the received first request; abstracting, from the block, the data responsive to the received first request; and sending the data to the client device.

* * * * *